United States Patent Office 3,031,444
Patented Apr. 24, 1962

3,031,444
17β-(2,3-EPOXIDOPROPENOYL)-SUBSTITUTED ANDROSTENES
Eugene J. Agnello, Lyme, and Gerald D. Laubach, Niantic, Conn., assignors to Chas. Pfizer & Co., Inc., New York, N.Y., a corporation of Delaware
No Drawing. Filed Jan. 22, 1960, Ser. No. 3,999
3 Claims. (Cl. 260—239.55)

This application is concerned with new and useful steroid compounds. More particularly, it is concerned with certain steroids having adrenocortical activity characterized by having unique chemical features in the carbon atom side chain at the 17β-position. It is concerned also with a method of making these valuable compounds and with pharmaceutical compositions containing them together with pharmaceutically acceptable excipients.

This application is a continuation-in-part of previously filed patent applications Serial Nos. 740,599, now abandoned; 749,601; 764,267 now abandoned and 764,269 now abandoned; filed June 9, 1958; June 9, 1958; September 30, 1958, and September 30, 1958, respectively. It should be noted that the system of nomenclature used herein is different from that employed in the previous applications. It is believed that the present system is in more strict conformance with preferred practice.

Compounds within the purview of this invention include those having the formula:

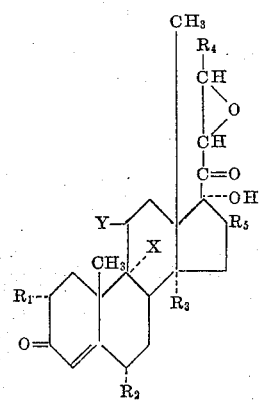
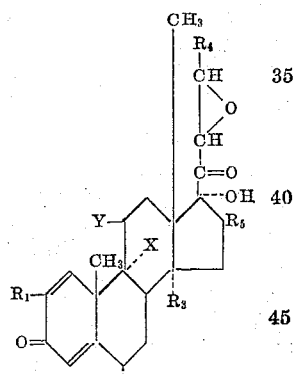

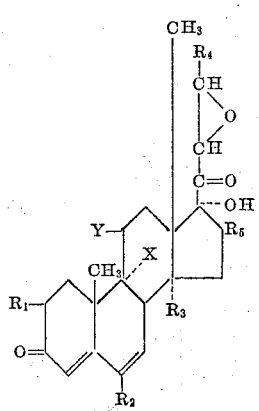
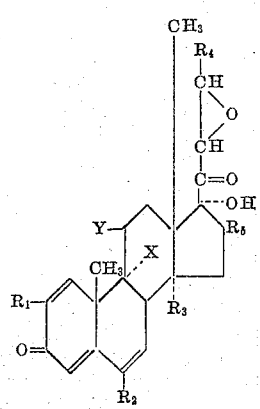

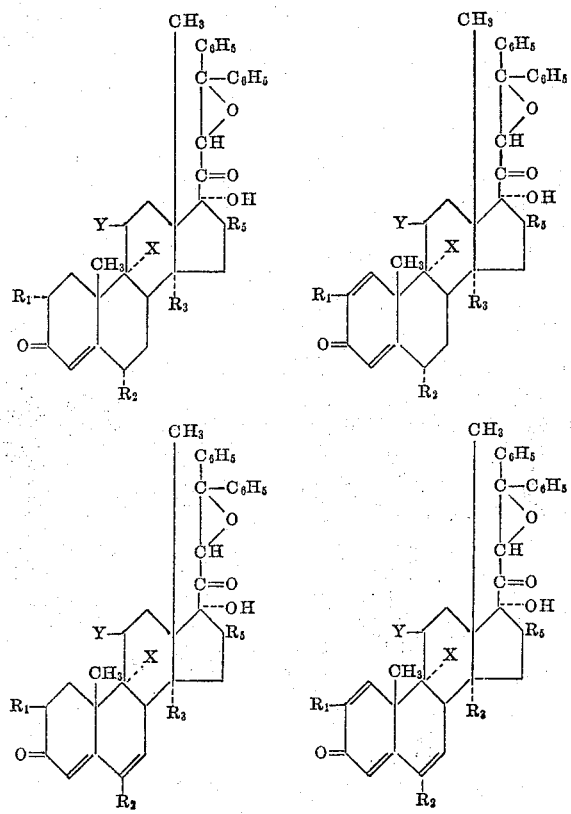

wherein $R_1$ is hydrogen or methyl; $R_2$ is hydrogen, fluorine, chlorine or methyl; $R_3$ is hydrogen or hydroxyl; $R_4$ is hydrogen, lower alkyl containing up to four carbon atoms or carboalkoxy in which the alkoxy moiety contains up to four carbon atoms and $R_5$ is

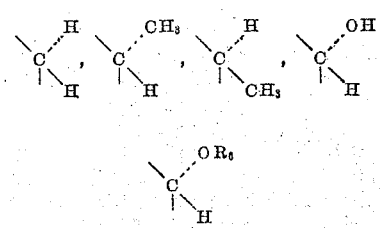

$R_6$ being an acyl group containing only carbon, hydrogen and oxygen being derived from mono- or dicarboxylic acids containing up to ten carbon atoms. The water solubility of the compounds derived from dicarboxylic acids is enhanced by conversion to alkali metal or alkaline earth metal salts by reaction with a suitable base such as sodium carbonate or calcium hydroxide. These salts are also included within the purview of this invention. In the above structures, X is hydrogen, α-halogen, α-methoxy or α-ethoxy and Y is keto or β-hydroxyl. In the compounds represented above, the carbon atom at the 16-position is always substituted with at least one hydrogen and at least three of $R_1$, $R_2$, $R_3$, and the second substituent on the number 16 carbon atom will always be hydrogen.

Also included within the compounds of this invention are further compounds in which hydroxyl groups at the 16- and 17-positions are derivatized with aldehydes or ketones containing from two to nine carbon atoms to form cyclic acetals or ketals known generically as acetonides, in this case 16α,17α-acetonides. The acetonide moiety or preferred compounds of this invention contain from two to nine carbon atoms.

The acetonides within the purview of this invention are prepared by procedures well known to those skilled in the art. They may be prepared, for example, by the procedure described by Woodward et al. in the Journal of the American Chemical Society, 74, p. 4241 (1952). In this procedure, the steroid compound is taken up in the carbonyl compound, for example, acetone, methyl ethyl ketone or di-n-butyl ketone which has been dried over a suitable drying agent such as anhydrous potassium carbonate. Anhydrous copper sulfate is added and the mixture agitated for from about 24 to about 48 hours. The mixture is then filtered and the desired product recovered, for example, by removal of the solvent in vacuo.

It will be noted from the above formulas that the presence of a new asymmetric center at C–21 gives rise to the possibility of two epimers. Both forms are active so that for most therapeutic purposes, it is immaterial whether a mixture or a pure form is used. If desired, pure forms may be obtained by chromatography using chloroform as the mobile phase and formamide as the stationary phase.

Starting compounds which are useful in the preparation of the valuable therapeutic agents of this invention are steroid 21-aldehydes. The compound 17β-(2,3-epoxido-propionyl)-Δ⁴-androstene-11β,17α-diol-3,20-dione is prepared in accordance with the following reaction. The reaction is illustrative of the preparation of other compounds within the scope of the invention.

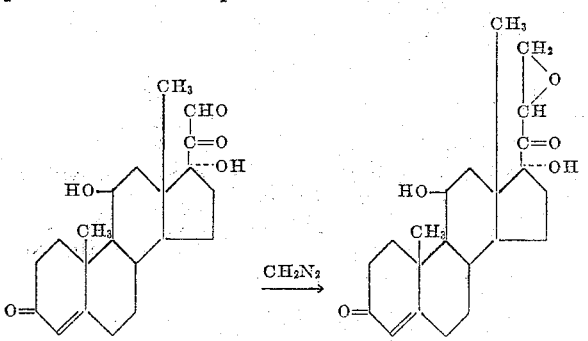

The 21-aldehydes used as starting materials for the preparation of the compounds of this invention are prepared by oxidation of the corresponding 21-alcohols. One procedure using cupric acetate, is illustrated in U.S. Patent 2,773,078, issued December 4, 1956. In an alternative method, the starting compound is reacted first with pyridine in the presence of an aromatic sulfonyl halide to prepare a pyridinium halide salt which is in turn treated with a nitroso compound, for example, p-nitroso-dimethylaniline, to prepare a nitrone. The 21-nitrone is then hydrolyzed to prepare the aldehyde.

Examples I through III which relate to the preparation of compounds having the structure:

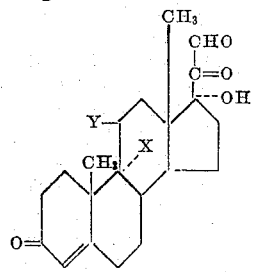

wherein Y and X have the same meaning as above set forth as illustrative of the procedures described in the above.

To illustrate by way of example the 21-alcohols which can be used to prepare the 21-aldehydes used as starting materials for the preparation of the compounds of this invention, there may be mentioned the known compounds cortisone, hydrocortisone, prednisone, prednisolone, 2α-methyl-hydrocortisone, 6α-methyl-hydrocortisone, Δ⁶-prednisolone, 16α-methyl-hydrocortisone, 16β-methyl-hydrocortisone, 16α-methyl-prednisolone, 16β-methyl-prednisolone, 6α-fluoro-hydrocortisone, 6α-fluoro-prednisolone, 16α-hydroxy-hydrocortisone, 6α-fluoro-16α-methyl-prednisolone, 6α-chloro-hydrocortisone, 9α-fluoro-hydrocortisone, 9α-fluoro-prednisolone, 9α-fluoro-16α-methyl-prednisolone, 9α-bromo-hydrocortisone and 9α-bromo-prednisolone.

All of the Δ⁴-21-alcohols used for the preparation of the 21-aldehydes useful as starting materials in this invention are known. So too are most of the Δ¹,⁴, Δ⁴,⁶ and Δ¹,⁴,⁶-21-alcohols which can be employed. Others are prepared using selenium dioxide to introduce a double bond at the 1-position and a selected quinone to introduce a double bond at the 6-position.

A double bond at the 6(7)-position is introduced using a quinone having an oxidation-reduction potential less than 0.5 at a temperature between 70° C. and 190° C. in an inert organic solvent having a boiling point of at least about 70° C. Suitable solvents include mononuclear aromatic hydrocarbons, mononuclear halogenated aromatic hydrocarbons, oxygenated polar alicyclic organic solvents and oxygenated polar aliphatic organic solvents. Typical solvents include tertiary butanol, n-amyl alcohol, hexanol, isoamyl alcohol, heptanol, 3-cyclohexanol, orthdichloro benzene, xylene, tertiary amyl alcohol, secondary amyl alcohol, benzene, toluene, acetic acid, propionic acid, butyric acid, butyl acetate, amyl acetate, hexyl acetate, butyl propionate, propyl propionate, and amyl propionate. The application of this reaction to the preparation of Δ⁴,⁶-compounds is illustrated in U.S. Patent No. 2,836,607, issued July 27, 1958.

A double bond is introduced at the 1(2)-position using selenium dioxide in an inert organic solvent at an elevated temperature. Solvents which are useful for this reaction include, for example, tertiary butanol, tertiary pentanol, benzene, ethylene glycol diethers such as dibutyl Cellosolve, dipropyl ether, ethylene glycol and various other glycol ethers, phenetole, xylene, dioxane and naphthalene. Preferred conditions include the addition of a lower aliphatic acid particularly acetic acid to a tert-butanol mixture. In carrying out the reaction, it is generally preferred to utilize temperatures of from about 75° C. to about 200° C. for from about 1 hour to about 100 hours. Generally, several molecular proportions of selenium dioxide are added during the reaction period. The application of this reaction is fully illustrated in co-pending application Serial No. 672,550, filed August 18, 1957.

It will be noted by reference to the formulas representing the compounds of this invention that it is specifically intended to include within the purview of the instant invention a 16α-hydroxylated compound in which the hydroxyl group is esterified with an acyl hydrocarbon group containing up to ten carbon atoms. The term "acyl hydrocarbon" includes acyl hydrocarbon groups containing only carbon, hydrogen and oxygen derived from monocarboxylic or dicarboxylic acids. In the event that the acyl hydrocarbon group chosen is one derived from a dicarboxylic acid; it is often advantageous to treat an adrenocortically active compound with a base derived from an alkali metal or alkaline earth metal to prepare a metal salt. These bases include, for example, sodium, potassium, barium and calcium hydroxide as well as the corresponding carbonates and bicarbonates. Products so prepared are especially useful because of their increased solubility in water.

The 16-hydroxyl group is readily esterified by treatment with acid anhydride in the presence of a tertiary amine base, such as pyridine or dimethylaniline in accordance with the procedures well known in the art. It is known that the 16α-hydroxyl group can be esterified without concomitant esterification of an 11β-hydroxyl group even though both hydroxyl groups are secondary.

Free alcohols are prepared from the corresponding esters by gentle hydrolysis using, for example, potassium carbonate in aqueous methanol.

For the preparation of the compounds of the instant inventon, the aldehyde is reacted with the selected diazo compound in a reaction inert solvent at a temperature of from about 0° C. to about 25° C., preferably from about 0° C. to about 15° C. for a period of from about 1 to about 24 hours.

Diazo compounds useful for the preparation of the active agents of this invention are well known in the art and include straight chain alkyl diazo compounds containing from one to four carbon atoms such as diazomethane, diazoethane, diazopropane and diazobutane. The diazo compounds also include diphenyldiazomethane and lower alkyl diazoacetates, the alkoxy group containing up to four carbon atoms such as methyl, ethyl, propyl, isopropyl and butyl diazoacetate.

The diazo compound, as is well known is most conveniently prepared in diethyl ether solution although other solvents have been employed. The solution is then added to the steroid in a suitable solvent. It is preferred that the steroid should be completely soluble in the solvent although this is not absolutely necessary. Suitable solvents for the steroid include polar lower aliphatic oxygenated organic solvents such as alkanols or ethers containing up to five carbon atoms. These include, for example, methanol, ethanol, propanol, butanol, pentanol, diethyl ether, propyl ethyl ether or tetrahydrofuran. It may also be convenient to use a mixture of solvents such as methanol and ether or dioxane and ethanol to enhance solubility.

In preferred practice, the reaction is initiated at about 0° C. and maintained at that temperature for several minutes, that is, about 30 minutes and then at a higher temperature for the balance of the reaction period. Suitable yields, however, can be obtained at any temperature within the disclosed range.

Although it is possible to obtain reaction products using any amount of diazo compound, preferred conditions include the use of at least an equimolar quantity of diazo compound, and for optimum yields, from about 400% excess to about 700% excess of diazo compound is utilized.

At the end of the reaction period, the product may be isolated by evaporation of the solvent and excess diazo compound. The evaporation is preferably carried out in vacuo in order to decrease the possibility of side reactions. Alternatively, the excess diazo compound is destroyed by the addition of dilute acid, for example, 6 N acetic acid and precipitating the product by concentrating the solution to about 20% of its original volume. The product is recovered by filtration.

To obtain a highly purified form, the product is taken up in a lower aliphatic halogenated organic solvent such as ethylene dichloride, chloroform or carbon tetrachloride and washed with an alkaline reagent such as an hydroxide, carbonate or bicarbonate of an alkali metal and then with water. The layers are separated and the organic layer dried over an anhydrous salt such as magnesium or sodium sulfate, filtered and evaporated to dryness. The residue is triturated with ether, filtered and dried.

The biologically active compounds of this invention which, as will be noted, may exist in epimeric forms may be administered alone or in combination with acceptable pharmaceutical carriers, the choice of which is determined by the preferred route of administration, the solubility of the compound and standard pharmaceutical practice. In general, the dosage of these compounds is of approximately the same order of magnitude as the dosage of hydrocortisone, and these compounds are useful to treat the types of pathological conditions often treated with hydrocortisone. Because of their great adrenocortical activity, it is sometimes possible to use dosages of these compounds which are lower than those of hydrocortisone.

For oral administration the compounds may be administered in the form of tablets containing excipients such as starch or milk sugar. Aqueous suspensions and elixirs which may be sweetened or flavored may also be used. To apply these therapeutic agents topically, they may be prepared in the form of ointments and salves in suitable bases especially non-aqueous petrolatum types bases. For intra-articular injection aqueous suspensions may be employed. In this case various suspending and wetting agents may be added to the compositions to obtain a suspension not tending to settle out easily or to pack down in the bottle in which it is stored. Intramuscular and subcutaneous dosage forms may also be prepared by standard pharmaceutical practice.

Apart from their therapeutic utility, certain of the compounds of this invention are useful because they can be converted to other compounds which are also therapeutically active. Thus, compounds of this invention in which the number three carbon atom of the 2,3-epoxido-propionyl group bears two hydrogen atoms can be converted to halohydrins having adrenocortical activity. This conversion is effected in accordance with the procedure described in copending and concurrently filed patent application Serial Number 3,998 which describes and claims the reaction of the epoxide with a halogen acid, preferably in excess, in a reaction inert organic solvent such as chloroform at a temperature of from about 15° C. to about 30° C. for a period of from about fifteen minutes to about four hours.

The following examples are given solely for the purpose of illustration and are not to be construed as limitations of this invention, many apparent variations of which are possible without departing from the spirit or scope thereof.

EXAMPLE I

*9α-Fluoro-Δ⁴-Pregnene-11β,17α-Diol-3,20-Dione-21-al*

A suspension of 500 mg. of 9α-fluoro-Δ⁴-pregnene-11β,17α,21-triol-3,20-dione synthesized according to Fried's method in 10 ml. of methanol was prepared and maintained at 60° C. while adding 750 mg. of cupric acetate partially dissolved in a mixture of 3 ml. of water and 12 ml. of methanol containing 3 drops of glacial acetic acid. The mixture was maintained at 60° C. for 30 minutes and the blue supernatant liquid decanted from the precipitated cuprous oxide. The blue solution was treated with 100 mg. of ethylenediamine tetraacetic acid and evaporated to a volume of about 4 ml. The moist residue was triturated with 20 ml. of water and filtered. The product was recovered as the monohydrate and converted to the non-hydrated form by heating at 135° C. at 0.5 mm. of mercury pressure for 24 hours.

This identical procedure was used to prepare the following compounds using the appropriate starting compounds. The list is given to avoid unnecessary repetition of experimental details.

(1) Δ⁴-pregnene-11β,17α,21-triol-3,20-dione-21-al
(2) 9α-chloro-Δ⁴-pregnene-11β,17α-diol-3,20-dione-21-al
(3) 9α-bromo-Δ⁴-pregnene-11β,17α-diol-3,20-dione-21-al
(4) 9α-iodo-Δ⁴-pregnene-11β,17α-diol-3,20-dione-21-al
(5) 9α-methoxy-Δ⁴-pregnene-11β,17α-diol-3,20-dione-21-al
(6) 9α-ethoxy-Δ⁴-pregnene-11β,17α-diol-3,20-dione-21-al
(7) 9α-fluoro-Δ⁴-pregnene-17α-ol-3,11,20-trione-21-al
(8) 9α-bromo-Δ⁴-pregnene-17α-ol-3,11,20-trione-21-al
(10) 9α-iodo-Δ⁴-pregnene-17α-ol-3,11,20-trione-21-al
(11) 9α-methoxy-Δ⁴-pregnene-17α-ol-3,11,20-trione-21-al

(12) 9α-ethoxy-Δ²-pregnene-17α-ol-3,11,20-trione-21-al
(13) Δ⁴-pregnene-17α-ol-3,11,20-trione-21-al In each instance the starting compound was prepared using the procedure of Fried and Sabo referred to above, except that in some instances it was necessary to oxidize an 11-hydroxyl group to an 11-keto group before proceeding with the preparation of the aldehyde. Example II gives a typical oxidation procedure. It will be noted that the 21-hydroxyl group is acylated before oxidation.

EXAMPLE II

*9α-Bromo-Δ⁴-Pregnene-17α,21-Diol-3,11,20-Trione*

To a solution containing 5 g. of 9α-bromo-Δ⁴-pregnene-3,20-dione-11β,17α,21-triol 21-acetate prepared according to the procedure of Fried and Sabo in 25 ml. of glacial acetic acid there was added 15 ml. of a solution of chromium trioxide in 9:1 acetic acid-water solution containing 76 mg. of chromium trioxide per ml. of solution. The mixture was kept at room temperature during the addition and for an additional four hours. The desired compound is precipitated as the acetate by the addition of water. It was converted to the free 21-alcohol by adding one molar portion of potassium carbonate in 10% water-methanol solution to a methanol solution of the ester. The mixture was stirred at room temperature for one hour and then poured into ice water to precipitate the free alcohol.

EXAMPLE III

*9α-Fluoro-Δ⁴-Pregnene-11β,17α-Diol-3,20-Dione-21-al*

A solution containing 3.6 g. of 9α-fluoro-Δ⁴-pregnene-11β,17α,21-triol-3,20-dione in 25 ml. of anhydrous pyridine was prepared. To this solution there was added 1.9 g. of p-toluenesulfonyl chloride and the solution allowed to stand at room temperature for 24 hours. The reaction mixture was concentrated to dryness at 60° C. in vacuo and residue triturated with 25 ml. of acetone, and 9α-fluoro-Δ⁴-pregnene-11β,17α-diol - 3,20 - dione 21-pyridinium chloride was collected by filtration.

The pyridinium chloride was taken up in a mixture containing 100 ml. of methanol and 50 ml. of water and a solution containing 1.3 g. of p-nitrosodimethylaniline and 2 g. of potassium bicarbonate in 30 ml. of water was added. The mixture was allowed to stand for one day and the resulting 9α-fluoro-Δ⁴-pregnene-11β,17α-diol-2,20-dione 21-N(p-dimethylamnophenyl) nitrone was collected by filtration.

The mixture was taken up in 75 ml. of 1 N hydrochloric acid and covered with 100 ml. of ether. The mixture was agitated until all of the solid had dissolved and the layers separated. The aqueous layer was extracted with three separate 100 ml. portions of ether and all of the ether layers combined. The organic solution was washed with 2.5 N hydrochloric acid, water, dilute sodium bicarbonate solution and again with water. It was dried over anhydrous magnesium sulfate, filtered and concentrated to dryness. The residue was dissolved in the minimum volume of acetone and treated with charcoal. The charcoal was removed and the desired product precipitated by the addition of water. It was collected by filtration and maintained at 135° C. at 0.5 mm. of mercury pressure for 24 hours. The product proved to be identical with that prepared using the procedure of Example I.

The identical procedure was used to prepare the compounds listed in Example I.

EXAMPLE IV

*17β-(2,3-Epoxido-Propionyl)-Δ⁴-Androstene-11β,17α-Diol-3-One*

A solution was prepared containing 1 mmole of Δ⁴-pregnene-11β,17α-diol-3,20-dione-21-al monohydrate in 35 ml. of methanol containing 17.5 ml. of ether. To this solution there was added a diazomethane solution containing 4 mmoles of diazomethane in 17.5 ml. of ether. The solution was maintained at 0° C. for 24 hours and the solution evaporated in vacuo. The residue was triturated with ether and the crystalline product recovered by filtration. A sample was recrystallized from ethyl acetate and dried in vacuo at 60° C. for 16 hours; M.P. 218–220° C. (d), $[\alpha]_D = +179°$ (dioxane), $$\lambda_{max}^{alc.} \ 242 \ m\mu(16,100)$$

*Analysis.*—Calcd. for $C_{22}H_{30}O_5$: C, 70.56; H, 8.08. Found: C, 71.32; H, 7.95.

EXAMPLE V

*17β-(2,3-Epoxido-Propionyl)-Δ¹,⁴-Androstadiene-11β,17α-Diol-3-One*

A solution containing 1 mmole of Δ¹,⁴-pregnadiene-11β,17α-diol-3,20-dione-21-al monohydrate in 35 ml. of methanol and 17.5 ml. of ether was prepared. To this solution there was added 7 mmoles of diazomethane in 17.5 ml. of ether at 0° C. After 15 minutes the mixture was removed from the low temperature medium and allowed to remain at room temperature for 2 hours. The excess diazomethane was destroyed by addition of 1 ml. of 6 N acetic acid. The solution was concentrated in vacuo to a total volume of about 5 ml. and taken up in 50 ml. of chloroform. The chloroform extract was washed 3 times with 5 ml. portions of 5% sodium bicarbonate and then 4 times with 5 ml. portions of water. The organic layer was dried over anhydrous sodium sulfate and concentrated to dryness. The residue was triturated with ether and the crystalline product recovered by filtration. A sample was recrystallized from ethyl acetate and dried in vacuo at 100° C. for 16 hours; M.P. 260.5–262.5° C., $$\lambda_{max}^{alc.} \ 243 \ m\mu(15,300)$$

$[\alpha]_D = +146$ (dioxane).

*Analysis.*—Calcd. for $C_{22}H_{28}O_5$: C, 70.94; H, 7.58. Found: C, 70.91; H, 7.56.

EXAMPLE VI

*17β - (2,3 - Epoxido - Propionyl) - Δ¹,⁴,⁶ - Androstatriene-11β,17α - Diol - 3 - one*

A solution containing 1 mmole of Δ¹,⁴,⁶-pregnatriene-11β,17α-diol-3,20-dione-21-al in 50 ml. of ethanol was prepared. To this solution there was added an ether solution containing 1 mmole of diazomethane and the solution was allowed to stand at 25° C. for 24 hours. The desired product was recovered by evaporation of the solvent in vacuo, trituration of the residue with ether and filtration.

EXAMPLE VII

*9α - Fluoro - 17β - (2,3 - Epoxido - Propionyl) - Δ⁴-Androstene - 11β,17α - Diol - 3 - one*

A solution containing 1 mmole of 9α-fluoro-Δ⁴-pregnene-11β,17α-diol-3,20-dione-21-al monohydrate in 50 ml. of propanol was prepared. To this solution there was added an ether solution containing 5 mmoles of diazomethane and the solution was allowed to stand at 15° C. for 15 hours. The desired product was recovered by evaporation of the solvent in vacuo, trituration of the residue with ether and filtration. A sample was recrystallized from ethyl acetate and dried in vacuo at 60° C. for 16 hours; M.P. 248–250° C., $[\alpha]_D = +281°$ (dioxane), $$\lambda_{max}^{alc.} \ 250 \ m\mu(17,000)$$

*Analysis.*—Calcd. for $C_{22}H_{29}O_5F$: C, 67.32; H, 7.45. Found: C, 66.89; H, 7.50.

EXAMPLE VIII

*9α - Fluoro - 17β - (2,3 - Epoxido - Propionyl) - Δ¹,⁴-Androstadiene - 11β,17α - Diol - 3 - one*

A solution containing 1 mmole of 9α-fluoro-Δ$^{1,4}$-pregnadiene-11β,17α-diol-3,20-dione-21-al monohydrate in 50 ml. of methyl isopropyl ether was prepared. To this solution there was added an ether solution containing 6 mmoles of diazomethane and the solution was allowed to stand at 10° C. for 20 hours. The desired product was recovered by evaporation of the solvent in vacuo, trituration of the residue with ether and filtration. A sample was recrystallized from ethyl acetate and dried in vacuo at 60° C. for 16 hours; M.P. 258° C. (d), [α]$_D$=+123° (dioxane), $$\lambda_{max.}^{alc.} \ 239 \ m\mu (15,600)$$

*Analysis.*—Calcd. for $C_{22}H_{27}O_5F$: C, 67.67; H, 6.97. Found: C, 68.00; H, 6.95.

EXAMPLE IX

*9α - Fluoro - 17β - (2,3 - Epoxido - Propionyl) - Δ$^{1,4,6}$-Androstatriene - 11β,17α - Diol - 3 - one*

A solution containing 1 mmole of 9α-fluoro-Δ$^{1,4,6}$-pregnatriene-11β,17α-diol-3,20-dione-21-al monohydrate in 50 ml. of propyl ethyl ether was prepared. To this solution there was added an ether solution containing 2 mmoles of diazomethane and the solution was allowed to stand at 20° C. for 2 hours. The desired product was recovered by evaporation of the solvent in vacuo, trituration of the residue with ether and filtration.

EXAMPLE X

*9α - Bromo - 17β - (2,3 - Epoxido - Propionyl) - Δ$^4$-Androstene - 11β,17α - Diol - 3 - one*

A solution containing 1 mmole of 9α-bromo-Δ$^4$-pregnene-11β,17α-diol-3,20-dione-21-al monohydrate in 50 ml. of tetrahydrofuran was prepared. To this solution there was added an ether solution containing 4 mmoles of diazomethane and the solution was allowed to stand at 10° C. for 16 hours. The desired product was recovered by evaporation of the solvent in vacuo, trituration of the residue with ether and filtration.

EXAMPLE XI

*16α - Methyl - 17β - (2,3 - Epoxido - Propionyl) - Δ$^4$-Androstene - 11β,17α - Diol - 3 - one*

A solution was prepared containing 1 mmole of 16α-methyl-Δ$^4$-pregnene-11β,17α-diol-3,20-dione-21-al monohydrate in 35 ml. of methanol containing 17.5 ml. of ether. To this solution there was added a diazomethane solution containing 4 mmoles of diazomethane in 17.5 ml. of ether. The solution was maintained at 0° C. for 24 hours and the solution evaporated in vacuo. The residue was triturated with ether and the crystalline product recovered by filtration.

EXAMPLE XII

*16β - Methyl - 17β - (2,3-Epoxido - Propionyl) - Δ$^4$-Androstene - 11β,17α - Diol - 3 - one*

A solution was prepared containing 1 mmole of 16β-methyl-Δ$^4$-pregnene-11β,17α-diol-3,20-dione-21-al monohydrate in 35 ml. of methanol containing 17.5 ml. of ether. To this solution there was added a diazomethane solution containing 4 mmoles of diazomethane in 17.5 ml. of ether. The solution was maintained at 0° C. for 24 hours and the solution evaporated in vacuo. The residue was triturated with ether and the crystalline product recovered by filtration.

EXAMPLE XIII

*6α - Fluoro - 17β - (2,3 - Epoxido - Propionyl) - Δ$^4$-Androstene - 11β,17α - Diol - 3 one*

A solution was prepared containing 1 mmole of 6α-fluoro-Δ$^4$-pregnene-11β,17α-diol-3,20-dione-21-al monohydrate in 35 ml. of methanol containing 17.5 ml. of ether. To this solution there was added a diazomethane solution containing 4 mmoles of diazomethane in 17.5 ml. of ether. The solution was maintained at 0° C. for 24 hours and the solution evaporated in vacuo. The residue was triturated with ether and the crystalline product recovered by filtration.

EXAMPLE IV

*6α - Chloro - 17β - (2,3 - Epoxido - Propionyl) - Δ$^4$-Androstene - 11β,17α - Diol - 3 - one*

A solution was prepared containing 1 mmole of 6α-chloro-Δ$^4$-pregnene-11β,17α-diol-3,20-dione-21-al monohydrate in 35 ml. of methanol containing 17.5 ml. of ether. To this solution there was added a diazomethane solution containing 4 mmoles of diazomethane in 17.5 ml. of ether. The solution was maintained at 0° C. for 24 hours and the solution evaporated in vacuo. The residue was triturated with ether and the crystalline product recovered by filtration.

EXAMPLE XV

*17β - (3 - Methyl - 2,3 - Epoxido - Propionyl) - Δ$^4$-Androstene - 11β,17α - Diol - 3 - one*

A solution was prepared containing 1 mmole of Δ$^4$-pregnene-11β,17α-diol-3,20-dione-21-al monohydrate in 35 ml. of methanol containing 17.5 ml. of ether. To this solution there was added a diazoethane solution containing 4 mmoles of diazoethane in 17.5 ml. of ether. The solution was maintained at 0° C. for 24 hours and the solution evaporated in vacuo. The residue was triturated with ether and the crystalline product recovered by filtration.

The reaction was repeated using respectively diazopropane, diazobutane, ethyldiazoacetate, propyldiazoacetate, butyldiazoacetate and diphenyldiazomethane to produce 17β - (3 - ethyl - 2,3 - epoxido - propionyl) - Δ$^4$-androstene-11β,17α - diol - 3 - one, 17β - (3 - propyl-2,3 - epoxido - propionyl) - Δ$^4$ - androstene - 11β,17α-diol - 3 - one, 17β - (3 - carbethoxy - 2,3 - epoxido-propionyl) - Δ$^4$ - androstene - 11β,17α - diol - 3 - one, 17β - (3 - carbopropoxy - 2,3 - epoxido - propionyl) - Δ$^4$-androstene - 11β,17α - diol - 3 - one, 17β - (3 - carbobutoxy - 2,3 - epoxido - propionyl) - Δ$^4$ - androstene-11β,17α - diol - 3 - one, 17β - (3,3 - diphenyl - 2,3-epoxido - propionyl) - Δ$^4$ - androstene - 11β,17α - diol-3 - one respectively.

EXAMPLE XVI

*17β-(3-Ethyl-2,3-Epoxido-Propionyl)-Δ$^{1,4}$-Androstadiene-11β,17α-Diol-3-one*

A solution was prepared containing 1 mmole of Δ$^{1,4}$-pregnadiene-11β,17α-diol-3,20-dione-21-al monohydrate in 35 ml. of ethanol containing 17.5 ml. of ether. To this solution there was added a diazopropane solution containing 4 mmoles of diazopropane in 17.5 ml. of ether. The solution was maintained at 0° C. for 24 hours and the solution evaporated in vacuo. The residue was triturated with ether and the crystalline product recovered by filtration.

This reaction was repeated using respectively diazoethane, diazobutane, ethyldiazoacetate, propyldiazoacetate, butyldiazoacetate and diphenyldiazomethane to produce 17β-(3-methyl-2,3-epoxido-propionyl)-Δ$^{1,4}$-androstadiene-11β,17α-diol-3-one,
17β-(3-propyl-2,3-epoxido-propionyl)-Δ$^{1,4}$-androstadiene-11β,17α-diol-3-one,
17β-(3-carbethoxy-2,3-epoxido-propionyl)-Δ$^{1,4}$-androstadiene-11β,17α-diol-3-one,
17β-(3-carbopropoxy-2,3-epoxido-propionyl)-Δ$^{1,4}$-androstadiene-11β,17α-diol-3-one,
17β-(3-carbobutoxy-2,3-epoxido-propionyl)-Δ$^{1,4}$-androstadiene-11β,17α-diol-3-one,
17β-(3,3-diphenyl-2,3-epoxido-propionyl)-Δ$^{1,4}$-androstadiene-11β,17α-diol-3-one respectively.

EXAMPLE XVII

*17β-(3-Carbethoxy-2,3-Epoxido-Propionyl)-Δ⁴-Androstene-11β,17α-Diol-3-one*

A solution was prepared containing 1 mmole of Δ⁴-pregnene-11β,17α-diol-3,20-dione-21-al monohydrate in 35 ml. of propanol containing 17.5 ml. of ether. To this solution there was added an ethyldiazoacetate solution containing 4 mmoles of ethyldiazoacetate in 17.5 ml. of ether. The solution was maintained at 0° C. for 24 hours and the solution evaporated in vacuo. The residue was triturated with ether and the crystalline product recovered by filtration.

EXAMPLE XVIII

*17β-(3-Carbopropoxy-2,3-Epoxido-Propionyl)-Δ¹,⁴-Androstadiene-11β,17α-Diol-3-one*

A solution was prepared containing 1 mmole of Δ¹,⁴-pregnadiene-11β,17α-diol-3,20-dione-21-al monohydrate in 35 ml. of methyl isopropyl ketone containing 17.5 ml. of ether. To this solution there was added a propyldiazoacetate solution containing 4 mmoles of propyldiazoacetate in 17.5 ml. of ether. The solution was maintained at 0° C. for 24 hours and the solution evaporated in vacuo. The residue was triturated with ether and the crystalline product recovered by filtration.

EXAMPLE XIX

*17β-(3-Carbobutoxy-2,3-Epoxido-Propionyl)-Δ⁴-Androstene-11β,17α-Diol-3-one*

A solution was prepared containing 1 mmole of Δ⁴-pregnene-11β,17α-diol-3,20-dione-21-al monohydrate in 35 ml. of propyl ethyl ether containing 17.5 ml. of ether. To this solution there was added a butyldiazoacetate solution containing 4 mmoles of butyldiazoacetate in 17.5 ml. of ether. The solution was maintained at 0° C. for 24 hours and the solution evaporated in vacuo. The residue was triturated with ether and the crystalline product recovered by filtration.

EXAMPLE XX

*17β-(3,3-Diphenyl-2,3-Epoxido-Propionyl)-Δ¹,⁴-Androstadiene-11β,17α-Diol-3-one*

A solution was prepared containing 1 mmole of Δ¹,⁴-pregnadiene-11β,17α-diol-3,20-dione-21-al monohydrate in 35 ml. of tetrahydrofuran containing 17.5 ml. of ether. To this solution there was added a diphenyl diazomethane solution containing 4 mmoles of diphenyldiazomethane in 17.5 ml. of ether. The solution was maintained at 0° C. for 24 hours and the solution evaporated in vacuo. The residue was triturated with ether and the crystalline product recovered by filtration.

The following compounds are prepared in accordance with the procedure set forth above. The list is given to avoid unnecessary repetition of experimental details.

9α-chloro-17β-(2,3-epoxido-propionyl)-Δ⁴-androstene-11β,17α-diol-3-one
9α-iodo-17β-(2,3-epoxido-propionyl)-Δ⁴-androstene-11β,17α-diol-3-one
9α-bromo-17β-(2,3-epoxido-propionyl)-Δ⁴-androstene-11β,17α-diol-3-one
9α-ethoxy-17β-(2,3-epoxido-propionyl)-Δ⁴-androstene-11β,17α-diol-3-one 17β-(2,3-epoxido-propionyl)-Δ⁴-androstene-17α-ol-3,11-dione
9α-fluoro-17β-(2,3-epoxido-propionyl)-Δ⁴-androstene-17α-ol-3,11-dione
9α-chloro-17β-(2,3-epoxido-propionyl)-Δ⁴-androstene-17α-ol-3,11-dione
9α-bromo-17β-(2,3-epoxido-propionyl)-Δ⁴-androstene-17α-ol-3,11-dione
9α-iodo-17β-(2,3-epoxido-propionyl)-Δ⁴-androstene-17α-ol-3,11-dione
9α-methoxy-17β-(2,3-epoxido-propionyl)-Δ⁴-androstene-17α-ol-3,11-dione
9α-ethoxy-17β-(2,3-epoxido-propionyl)-Δ⁴-androstene-17α-ol-3,11-dione 2α-methyl-17β-(2,3-epoxido-propionyl)-Δ⁴-androstene-11β,17α-diol-3-one
2α-methyl-9α-fluoro-17β-(2,3-epoxido-propionyl)-Δ⁴-androstene-11β,17α-diol-3-one
2α-methyl-9α-chloro-17β-(2,3-epoxido-propionyl)-Δ⁴-androstene-11β,17α-diol-3-one
2α-methyl-9α-bromo-17β-(2,3-epoxido-propionyl)-Δ⁴-androstene-11β,17α-diol-3-one
2α-methyl-9α-iodo-17β-(2,3-epoxido-propionyl)-Δ⁴-androstene-11β,17α-diol-3-one
2α-methyl-9α-methoxy-17β-(2,3-epoxido-propionyl)-Δ⁴-androstene-11β,17α-diol-3-one
2α-methyl-9α-ethoxy-17β-(2,3-epoxido-propionyl)-Δ⁴-androstene-11β,17α-diol-3-one 2α-methyl-17β-(2,3-epoxido-propionyl)-Δ⁴-androstene-17α-ol-3,11-dione
2α-methyl-9α-fluoro-17β-(2,3-epoxido-propionyl)-Δ⁴-androstene-17α-ol-3,11-dione
2α-methyl-9α-chloro-17β-(2,3-epoxido-propionyl)-Δ⁴-androstene-17α-ol-3,11-dione
2α-methyl-9α-bromo-17β-(2,3-epoxido-propionyl)-Δ⁴-androstene-17α-ol-3,11-dione
2α-methyl-9α-iodo-17β-(2,3-epoxido-propionyl)-Δ⁴-androstene-17α-ol-3,11-dione
2α-methyl-9α-methoxy-17β-(2,3-epoxido-propionyl)-Δ⁴-androstene-17α-ol-3,11-dione
2α-methyl-9α-ethoxy-17β-(2,3-epoxido-propionyl)-Δ⁴-androstene-17α-ol-3,11-dione 6α-methyl-17β-(2,3-epoxido-propionyl)-Δ⁴-androstene-11β,17α-diol-3-one
6α-methyl-9α-fluoro-17β-(2,3-epoxido-propionyl)-Δ⁴-androstene-11β,17α-diol-3-one
6α-methyl-9α-chloro-17β-(2,3-epoxido-propionyl)-Δ⁴-androstene-11β,17α-diol-3-one
6α-methyl-9α-iodo-17β-(2,3-epoxido-propionyl)-Δ⁴-androstene-11β,17α-diol-3-one
6α-methyl-9α-bromo-17β-(2,3-epoxido-propionyl)-Δ⁴-androstene-11β,17α-diol-3-one
6α-methyl-9α-methoxy-17β-(2,3-epoxido-propionyl)-Δ⁴-androstene-11β,17α-diol-3-one
6α-methyl-9α-ethoxy-17β-(2,3-epoxido-propionyl)-Δ⁴-androstene-11β,17α-diol-3-one
6α-methyl-17β-(2,3-epoxido-propionyl)-Δ⁴-androstene-17α-ol-3,11-dione
6α-methyl-9α-fluoro-17β-(2,3-epoxido-propionyl)-Δ⁴-androstene-17α-ol-3,11-dione
6α-methyl-α-chloro-17β-(2,3-epoxido-propionyl)-Δ⁴-androstene-17α-ol-3,11-dione
6α-methyl-9α-bromo-17β-(2,3-epoxido-propionyl)-Δ⁴-androstene-17α-ol-3,11-dione
6α-methyl-9α-iodo-17β-(2,3-epoxido-propionyl)-Δ⁴-androstene-17α-ol-3,11-dione
6α-methyl-9α-methoxy-17β-(2,3-epoxido-propionyl)-Δ⁴-androstene-17α-ol-3,11-dione
6α-methyl-9α-ethoxy-17β-(2,3-epoxido-propionyl)-Δ⁴-androstene-17-ol-3,11-dione 17β-(2,3-epoxido-propionyl)-Δ⁴-androstene-11β,14α,17α-triol-3-one
9α-fluoro-17β-(2,3-epoxido-propionyl)-Δ⁴-androstene-11β,14α,17α-triol-3-one
9α-chloro-17β-(2,3-epoxido-propionyl)-Δ⁴-androstene-11β,14α,17α-triol-3-one
9α-bromo-17β-(2,3-epoxido-propionyl)-Δ⁴-androstene-11β,14α,17α-triol-3-one
9α-iodo-17β-(2,3-epoxido-propionyl)-Δ⁴-androstene-11β,14α,17α-triol-3-one
9α-methoxy-17β-(2,3-epoxido-propionyl)-Δ⁴-androstene-11β,14α,17α-triol-3-one 9α-ethoxy-17β-(2,3-epoxido-propionyl)-Δ⁴-androstene-11β,14α,17α-triol-3-one 17β-(2,3-epoxido-propionyl)-Δ⁴-androstene-14α,17α-diol-3,11-dione
9α-fluoro-17β-(2,3-epoxido-propionyl)-Δ⁴-androstene-14α,17α-diol-3,11-dione
9α-chloro-17β-(2,3-epoxido-propionyl)-Δ⁴-androstene-14α,17α-diol-3,11-dione
9α-bromo-17β-(2,3-epoxido-propionyl)-Δ⁴-androstene-14α,17α-diol-3,11-dione
9α-iodo-17β-(2,3-epoxido-propionyl)-Δ⁴-androstene-14α,17α-diol-3,11-dione
9α-methoxy-17β-(2,3-epoxido-propionyl)-Δ⁴-androstene-14α,17α-diol-3,11-dione
9α-ethoxy-17β-(2,3-epoxido-propionyl)-Δ⁴-androstene-14α,17α-diol-3,11-dione 17β-(2,3-epoxido-propionyl)-Δ⁴-androstene-11β,16α,17α-triol-3-one
9α-fluoro-17β-(2,3-epoxido-propionyl)-Δ⁴-androstene-11β,16α,17α-triol-3-one
9α-chloro-17β-(2,3-epoxido-propionyl)-Δ⁴-androstene-11β,16α,17α-triol-3-one
9α-bromo-17β-(2,3-epoxido-propionyl-Δ⁴-androstene-11β,16α,17α-triol-3-one
9α-iodo-17β-(2,3-epoxido-propionyl)-Δ⁴-androstene-11β,16α,17α-triol-3-one
9α-methoxy-17β-(2,3-epoxido-propionyl)-Δ⁴-androstene-11β,16α,17α-triol-3-one
9α-ethoxy-17β-(2,3-epoxido-propionyl)-Δ⁴-androstene-11β,16α,17α-triol-3-one 17β-(2,3-epoxido-propionyl)-Δ⁴-androstene-16α,17α-diol-3,11-dione
9α-fluoro-17β-(2,3-epoxido-propionyl)-Δ⁴-androstene-16α,17α-diol-3,11-dione
9α-chloro-17β-(2,3-epoxido-propionyl)-Δ⁴-adrostene-16α,17α-diol-3,11-dione
9α-bromo-17β-(2,3-epoxido-propionyl)-Δ⁴-androstene-16α,17α-diol-3,11-dione
9α-iodo-17β-(2,3-epoxido-propionyl)-Δ⁴-androstene-16α,17α-diol-3,11-dione
9α-methoxy-17β-(2,3-epoxido-propionyl)-Δ⁴-androstene-16α,17α-diol-3,11-dione
9α-ethoxy-17β-(2,3-epoxido-propionyl)-Δ⁴-androstene-16α,17α-diol-3,11-dione 9α-chloro-17β-(2,3-epoxido-propionyl)-Δ¹,⁴-androstadiene-11β,17α-diol-3-one
9α-iodo-17β-(2,3-epoxido-propionyl)-Δ¹,⁴-androstadiene-11β,17α-diol-3-one
9α-bromo-17β-(2,3-epoxido-propionyl)-Δ¹,⁴-androstadiene-11β,17α-diol-3-one
9α-methoxy-17β-(2,3-epoxido-propionyl)-Δ¹,⁴-androstadiene-11β,17α-diol-3-one
9α-ethoxy-17β-(2,3-epoxido-propionyl)-Δ¹,⁴-androstadiene-11β,17α-diol-3-one 17β-(2,3-epoxido-propionyl)-Δ¹,⁴-androstadiene-17α-ol-3,11-dione
9α-fluoro-17β-(2,3-epoxido-propionyl)-Δ¹,⁴-androstadiene-17α-ol-3,11-dione
9α-chloro-17β-(2,3-epoxido-propionyl)-Δ¹,⁴-androstadiene-17α-ol-3,11-dione
9α-bromo-17β-(2,3-epoxido-propionyl)-Δ¹,⁴-androstadiene-17α-ol-3,11-dione
9α-iodo-17β-(2,3-epoxido-propionyl)-Δ¹,⁴-androstadiene-17α-ol-3,11-dione
9α-methoxy-17β-(2,3-epoxido-propionyl)-Δ¹,⁴-androstadiene-17α-ol-3,11-dione
9α-ethoxy-17β-(2,3-epoxido-propionyl)-Δ¹,⁴-androstadiene-17α-ol-3,11-dione 2-methyl-17β-(2,3-epoxido-propionyl)-Δ¹,⁴-androstadiene-11β,17α-diol-3-one
2-methyl-9α-fluoro-17β-(2,3-epoxido-propionyl)-Δ¹,⁴-androstadiene-11β,17α-diol-3-one
2-methyl-9α-chloro-17β-(2,3-epoxido-propionyl)-Δ¹,⁴-androstadiene-11β,17α-diol-3-one
2-methyl-9α-bromo-17β-(2,3-epoxido-propionyl)-Δ¹,⁴-androstadiene-11β,17α-diol-3-one
2-methyl-9α-iodo-17β-(2,3-epoxido-propionyl)-Δ¹,⁴-androstadiene-11β,17α-diol-3-one
2-methyl-9α-methoxy-17β-(2,3-epoxido-propionyl)-Δ¹,⁴-androstadiene-11β,17α-diol-3-one
2-methyl-9α-ethoxy-17β-(2,3-epoxido-propionyl)-Δ¹,⁴-androstadiene-11β,17α-diol-3-one 2-methyl-17β-(2,3-epoxido-propionyl)-Δ¹,⁴-androstadiene-17α-ol-3,11-dione
2-methyl-9α-fluoro-17β-(2,3-epoxido-propionyl)-Δ¹,⁴-androstadiene-17α-ol-3,11-dione
2-methyl-9α-chloro-17β-(2,3-epoxido-propionyl)-Δ¹,⁴-androstadiene-17α-ol-3,11-dione
2-methyl-9α-bromo-17β-(2,3-epoxido-propionyl)-Δ¹,⁴-androstadiene-17α-ol-3,11-dione
2-methyl-9α-iodo-17β-(2,3-epoxido-propionyl)-Δ¹,⁴-androstadiene-17α-ol-3,11-dione
2-methyl-9α-methoxy-17β-(2,3-epoxido-propionyl)-Δ¹,⁴-androstadiene-17α,ol-3,11-dione
2-methyl-9α-ethoxy-17β-(2,3-epoxido-propionyl)-Δ¹,⁴-androstadiene-17α-ol-3,11-dione 6α-methyl-17β-(2,3-epoxido-propionyl)-Δ¹,⁴-androstadiene-11β,17α-diol-3-one
6α-methyl-9α-fluoro-17β-(2,3-epoxido-propionyl))-Δ¹,⁴-androstadiene-11β,17α-diol-3-one
6α-methyl-9α-chloro-17β-(2,3-epoxido-propionyl)-Δ¹,⁴-androstadiene-11β,17α-diol-3-one
6α-methyl-9α-iodo-17β-(2,3-epoxido-propionyl)-Δ¹,⁴-androstadiene-11β,17α-diol-3-one
6α-methyl-9α-bromo-17β-(2,3-epoxido-propionyl)-Δ¹,⁴-androstadiene-11β,17α-diol-3-one
6α-methyl-9α-methoxy-17β-(2,3-epoxido-propionyl)-Δ¹,⁴-androstadiene-11β,17α-diol-3-one
6α-methyl-9α-ethoxy-17β-(2,3-epoxido-propionyl)-Δ¹,⁴-androstadiene-11β,17α-diol-3-one 6α-methyl-17β-(2,3-epoxido-propionyl)-Δ¹,⁴-androstadiene-17α-ol-3,11-dione
6α-methyl-9α-fluoro-17β-(2,3-epoxido-propionyl)-Δ¹,⁴-androstadiene-17α-ol-3,11-dione
6α-methyl-9α-chloro-17β-(2,3-epoxido-propionyl)-Δ¹,⁴-androstadiene-17α-ol-3,11-dione
6α-methyl-9α-bromo-17β-(2,3-epoxido-propionyl)-Δ¹,⁴-androstadiene-17α-ol-3,11-dione
6α-methyl-9α-iodo-17β-(2,3-epoxido-propionyl)-Δ¹,⁴-androstadiene-17α-ol-3,11-dione
6α-methyl-9α-methoxy-17β-(2,3-epoxido-propionyl)-Δ¹,⁴-androstadiene-17α-ol-3,11-dione
6α-methyl-9α-ethoxy-17β-(2,3-epoxido-propionyl)-Δ¹,⁴-androstadiene-17α-ol-3,11-dione 17β-(2,3-epoxido-propionyl)-Δ¹,⁴-androstadiene-11β,14α,17α-triol-3-one
9α-fluoro-17β-(2,3-epoxido-propionyl)-Δ¹,⁴-androstadiene-11β,14α,17α-triol-3-one
9α-chloro-17β-(2,3-epoxido-propionyl)-Δ¹,⁴-androstadiene-11β,14α,17α-triol-3-one
9α-bromo-17β-(2,3-epoxido-propionyl)-Δ¹,⁴-androstadiene-11β,14α,17α-triol-3-one
9α-iodo-17β-(2,3-epoxido-propionyl)-Δ¹,⁴-androstadiene-11β,14α,17α-triol-3-one
9α-methoxy-17β-(2,3-epoxido-propionyl)-Δ¹,⁴-androstadiene-11β,14α,17α-triol-3-one
9α-ethoxy-17β-(2,3-epoxido-propionyl)-Δ¹,⁴-androstadiene-11β,14α,17α-triol-3-one 17β-(2,3-epoxido-propionyl)-Δ¹,⁴-androstadiene-14α,17α-diol-3,11-dione
9α-fluoro-17β-(2,3-epoxido-propionyl)-Δ¹,⁴-androstadiene-14α,17α-diol-3,11-dione
9α-chloro-17β-(2,3-epoxido-propionyl)-Δ¹,⁴-androstadiene-14α,17α-diol-3,11-dione 9α-bromo-17β-(2,3-epoxido-propionyl)-Δ$^{1,4}$-androstadiene-14α,17α-diol-3,11-dione
9α-iodo-17β-(2,3-epoxido-propionyl)-Δ$^{1,4}$-androstadiene-14α,17α-diol-3,11-dione
9α-methoxy-17β-(2,3-epoxido-propionyl)-Δ$^{1,4}$-androstadiene-14α,17α-diol-3,11-dione
9α-ethoxy-17β-(2,3-epoxido-propionyl)-Δ$^{1,4}$-androstadiene-14α,17α-diol-3,11-dione 17β-(2,3-epoxido-propionyl)-Δ$^{1,4}$-androstadiene-11β,16α,17α-triol-3-one
9α-fluoro-17β-(2,3-epoxido-propionyl)-Δ$^{1,4}$-androstadiene-11β,16α,17α-triol-3-one
9α-chloro-17β-(2,3-epoxido-propionyl)-Δ$^{1,4}$-androstadiene-11β,16α,17α-triol-3-one
9α-bromo-17β-(2,3-epoxido-propionyl)-Δ$^{1,4}$-androstadiene-11β,16α,17α-triol-3-one
9α-iodo-17β-(2,3-epoxido-propionyl)-Δ$^{1,4}$-androstadiene-11β,16α,17α-triol-3-one
9α-methoxy-17β-(2,3-epoxido-propionyl)-Δ$^{1,4}$-androstadiene-11β,16α,17α-triol-3-one
9α-ethoxy-17β-(2,3-epoxido-propionyl)-Δ$^{1,4}$-androstadiene-11β,16α,17α-triol-3-one 17β-(2,3-epoxido-propionyl)-Δ$^{1,4}$-androstadiene-16α,17α-diol-3,11-dione
9α-chloro-17β-(2,3-epoxido-propionyl)-Δ$^{1,4}$-androstadiene-16α,17α-diol-3,11-dione
9α-bromo-17β-(2,3-epoxido-propionyl)-Δ$^{1,4}$-androstadiene-16α,17α-diol-3,11-dione
9α-iodo-17β-(2,3-epoxido-propionyl)-Δ$^{1,4}$-androstadiene-16α,17α-diol-3,11-dione
9α-methoxy-17β-(2,3-epoxido-propionyl)-Δ$^{1,4}$-androstadiene-16α,17α-diol-3,11-dione
9α-ethoxy-17β-(2,3-epoxido-propionyl)-Δ$^{1,4}$-androstadiene-16α,17α-diol-3,11-dione 17β-(2,3-epoxido-propionyl)-Δ$^{4,6}$-androstadiene-11β-17α-diol-3-one
9α-fluoro-17β-(2,3-epoxido-propionyl)-Δ$^{4,6}$-androstadiene-11β,17α-diol-3-one
9α-chloro-17β-(2,3-epoxido-propionyl)-Δ$^{4,6}$-androstadiene-11β,17α-diol-3-one
9α-iodo-17β-(2,3-epoxido-propionyl)-Δ$^{4,6}$-androstadiene-11β,17α-diol-3-one
9α-bromo-17β-(2,3-epoxido-propionyl)-Δ$^{4,6}$-androstadiene-11β,17α-diol-3-one
9α-methoxy-17β-(2,3-epoxido-propionyl)-Δ$^{4,6}$-androstadiene-11β,17α-diol-3-one
9α-ethoxy-17β-(2,3-epoxido-propionyl)-Δ$^{4,6}$-androstadiene-11β,17α-diol-3-one 17β-(2,3-epoxido-propionyl)-Δ$^{4,6}$-androstadiene-17α-ol-3,11-dione
9α-fluoro-17β-(2,3-epoxido-propionyl)-Δ$^{4,6}$-androstadiene-17α-ol-3,11-dione
9α-chloro-17β-(2,3-epoxido-propionyl)-Δ$^{4,6}$-androstadiene-17α-ol-3,11-dione
9α-bromo-17β-(2,3-epoxido-propionyl)-Δ$^{4,6}$-androstadiene-17α-ol-3,11-dione
9α-iodo-17β-(2,3-epoxido-propionyl)-Δ$^{4,6}$-androstadiene-17α-ol-3,11-dione
9α-methoxy-17β-(2,3-epoxido-propionyl)-Δ$^{4,6}$-androstadiene-17α-ol-3,11-dione
9α-ethoxy-17β-(2,3-epoxido-propionyl)-Δ$^{4,6}$-androstadiene-17α-ol-3,11-dione 2α-methyl-17β-(2,3-epoxido-propionyl)-Δ$^{4,6}$-androstadiene-11β,17α-diol-3-one
2α-methyl-9α-fluoro-17β-(2,3-epoxido-propionyl)-Δ$^{4,6}$-androstadiene-11β,17α-diol-3-one
2α-methyl-9α-chloro-17β-(2,3-epoxido-propionyl)-Δ$^{4,6}$-androstadiene-11β,17α-diol-3-one
2α-methyl-9α-bromo-17β-(2,3-epoxido-propionyl)-Δ$^{4,6}$-androstadiene-11β,17α-diol-3-one
2α-methyl-9α-iodo-17β-(2,3-epoxido-propionyl)-Δ$^{4,6}$-androstadiene-11β,17α-diol-3-one
2α-methyl-9α-methoxy-17β-(2,3-epoxido-propionyl)-Δ$^{4,6}$-androstadiene-11β,17α-diol-3-one
2α-methyl-9α-ethoxy-17β-(2,3-epoxido-propionyl)-Δ$^{4,6}$-androstadiene-11β,17α-diol-3-one 2α-methyl-17β-(2,3-epoxido-propionyl)-Δ$^{4,6}$-androstadiene-17α-ol-3,11-dione
2α-methyl-9α-fluoro-17β-(2,3-epoxido-propionyl)-Δ$^{4,6}$-androstadiene-17α-ol-3,11-dione
2α-methyl-9α-chloro-17β-(2,3-epoxido-propionyl)-Δ$^{4,6}$-androstadiene-17α-ol-3,11-dione
2α-methyl-9α-bromo-17β-(2,3-epoxido-propionyl)-Δ$^{4,6}$-androstadiene-17α-ol-3,11-dione
2α-methyl-9α-iodo-17β-(2,3-epoxido-propionyl)-Δ$^{4,6}$-androstadiene-17α-ol-3,11-dione
2α-methyl-9α-methoxy-17β-(2,3-epoxido-propionyl)-Δ$^{4,6}$-androstadiene-17α-ol-3,11-dione
2α-methyl-9α-ethoxy-17β-(2,3-epoxido-propionyl)-Δ$^{4,6}$-androstadiene-17α-ol-3,11-dione 6-methyl-17β-(2,3-epoxido-propionyl)-Δ$^{4,6}$-androstadiene-11β,17α-diol-3-one
6-methyl-9α-fluoro-17β-(2,3-epoxido-propionyl)-Δ$^{4,6}$-androstadiene-11β,17α-diol-3-one
6-methyl-9α-chloro-17β-(2,3-epoxido-propionyl)-Δ$^{4,6}$-androstadiene-11β,17α-diol-3-one
6-methyl-9α-iodo-17β-(2,3-epoxido-propionyl)-Δ$^{4,6}$-androstadiene-11β,17α-diol-3-one
6-methyl-9α-bromo-17β-(2,3-epoxido-propionyl)-Δ$^{4,6}$-androstadiene-11β,17α-diol-3-one
6-methyl-9α-methoxy-17β-(2,3-epoxido-propionyl)-Δ$^{4,6}$-androstadiene-11β,17α-diol-3-one
6-methyl-9α-ethoxy-17β-(2,3-epoxido-propionyl)-Δ$^{4,6}$-androstadiene-11β,17α-diol-3-one 6-methyl-17β-(2,3-epoxido-propionyl)-Δ$^{4,6}$-androstadiene-17α-ol-3,11-dione
6-methyl-9α-fluoro-17β-(2,3-epoxido-propionyl)-Δ$^{4,6}$-androstadiene-17α,-ol-3,11-dione
6-methyl-9α-chloro-17β-(2,3-epoxido-propionyl)-Δ$^{4,6}$-androstadiene-17α-ol-3,11-dione
6-methyl-9α-bromo-17β-(2,3-epoxido-propionyl)-Δ$^{4,6}$-androstadiene-17α-ol-3,11-dione
6-methyl-9α-iodo-17β-(2,3-epoxido-propionyl)-Δ$^{4,6}$-androstadiene-17α-ol-3,11-dione
6-methyl-9α-methoxy-17β-(2,3-epoxido-propionyl)-Δ$^{4,6}$-androstadiene-17α-ol-3,11-dione
6-methyl-9α-ethoxy-17β-(2,3-epoxido-propionyl)-Δ$^{4,6}$-androstadiene-17α-ol-3,11-dione 17β-(2,3-epoxido-propionyl)Δ$^{4,6}$-androstadiene-11β,14α,17α-triol-3-one
9α-fluoro-17β-(2,3-epoxido-propionyl)-Δ$^{4,6}$-androstadiene-11β,14α,17α-triol-3-one
9α-chloro-17β-(2,3-epoxido-propionyl)-Δ$^{4,6}$-androstadiene-11β,14α,17α-triol-3-one
9α-bromo-17β-(2,3-epoxido-propionyl)-Δ$^{4,6}$-androstadiene-11β,14α,17α-triol-3-one
9α-iodo-17β-(2,3-epoxido-propionyl)-Δ$^{4,6}$-androstadiene-11β,14α,17α-triol-3-one
9α-methoxy-17β-(2,3-epoxido-propionyl)-Δ$^{4,6}$-androstadiene-11β,14α,17α-triol-3-one
9α-ethoxy-17β-(2,3-epoxido-propionyl)-Δ$^{4,6}$-androstadiene-11β,14α,17α-triol-3-one 17β-(2,3-epoxido-propionyl)-Δ$^{4,6}$-androstadiene-14α,17α-diol-3,11-dione
9α-fluoro-17β-(2,3-epoxido-propionyl)-Δ$^{4,6}$-androstadiene-14α,17α-diol-3,11-dione
9α-chloro-17β-(2,3-epoxido-propionyl)-Δ$^{4,6}$-androstadiene-14α,17α-diol-3,11-dione
9α-bromo-17β-(2,3-epoxido-propionyl)-Δ$^{4,6}$-androstadiene-14α,17α-diol-3,11-dione
9α-iodo-17β-(2,3-epoxido-propionyl)-Δ$^{4,6}$-androstadiene-14α,17α-diol-3,11-dione
9α-methoxy-17β-(2,3-epoxido-propionyl)-Δ$^{4,6}$-androstadiene-14α,17α-diol-3,11-dione 9α-ethoxy-17β-(2,3-epoxido-propionyl)-Δ⁴,⁶-androstadiene-14α,17α-diol-3,11-dione 17β-(2,3-epoxido-propionyl)-Δ⁴,⁶-androstadiene-11β,16α,17α-triol-3-one
9α-fluoro-17β-(2,3-epoxido-propionyl)-Δ⁴,⁶-androstadiene-11β,16α,17α-triol-3-one
9α-chloro-17β-(2,3-epoxido-propionyl)-Δ⁴,⁶-androstadiene-11β,16α,17α-triol-3-one
9α-bromo-17β-(2,3-epoxido-propionyl)-Δ⁴,⁶-androstadiene-11β,16α,17α-triol-3-one
9α-iodo-17β-(2,3-epoxido-propionyl)-Δ⁴,⁶-androstadiene-11β,16α,17-triol-3-one
9α-methoxy-17β-(2,3-epoxido-propionyl)-Δ⁴,⁶-androstadiene-11β,16α,17α-triol-3-one
9α-ethoxy-17β-(2,3-epoxido-propionyl)-Δ⁴,⁶-androstadiene-11β,16α,17α-triol-3-one 9α-fluoro-16α-methyl-17β-(2,3-epoxido-propionyl)-Δ⁴-androstene-11β,17α-diol-3-one
9α-chloro-16α-methyl-17β-(2,3-epoxido-propionyl)-Δ⁴-androstene-11β,17α-diol-3-one
9α-bromo-16α-methyl-17β-(2,3-epoxido-propionyl)-Δ⁴-androstene-11β,17α-diol-3-one
9α-iodo-16α-methyl-17β-(2,3-epoxido-propionyl)-Δ⁴-androstene-11β,17α-diol-3-one
9α-methoxy-16α-methyl-17β-(2,3-epoxido-propionyl)-Δ⁴-androstene-11β,17α-diol-3-one
9α-ethoxy-16α-methyl-17β-(2,3-epoxido-propionyl)-Δ⁴-androstene-11β,17α-diol-3-one 16α-methyl-17β-(2,3-epoxido-propionyl)-Δ⁴,⁶-androstadiene-11β,17α-diol-3-one
9α-fluoro-16α-methyl-17β-(2,3-epoxido-propionyl)-Δ⁴,⁶-androstadiene-11β,17α-diol-3-one
9α-chloro-16α-methyl-17β-(2,3-epoxido-propionyl)-Δ⁴,⁶-androstadiene-11β,17α-diol-3-one
9α-bromo-16α-methyl-17β-(2,3-epoxido-propionyl)-Δ⁴,⁶-androstadiene-11β,17α-diol-3-one
9α-iodo-16α-methyl-17β-(2,3-epoxido-propionyl)-Δ⁴,⁶-androstadiene-11β,17α-diol-3-one
9α-methoxy-16α-methyl-17β-(2,3-epoxido-propionyl)-Δ⁴,⁶-androstadiene-11β,17α-diol-3-one
9α-ethoxy-16α-methyl-17β-(2,3-epoxido-propionyl)-Δ⁴,⁶-androstadiene-11β,17α-diol-3-one 16α-methyl-17β-(2,3-epoxido-propionyl)-Δ¹,⁴-androstadiene-11β,17α-diol-3-one
9α-fluoro-16α-methyl-17β-(2,3-epoxido-propionyl)-Δ¹,⁴-androstadiene-11β,17α-diol-3-one
9α-chloro-16α-methyl-17β-(2,3-epoxido-propionyl)-Δ¹,⁴-androstadiene-11β,17α-diol-3-one
9α-bromo-16α-methyl-17β-(2,3-epoxido-propionyl)-Δ¹,⁴-androstadiene-11β,17α-diol-3-one
9α-iodo-16α-methyl-17β-(2,3-epoxido-propionyl)-Δ¹,⁴-androstadiene-11β,17α-diol-3-one
9α-methoxy-16α-methyl-17β-(2,3-epoxido-propionyl)-Δ¹,⁴-androstadiene-11β,17α-diol-3-one
9α-ethoxy-16α-methyl-17β-(2,3-epoxido-propionyl)-Δ¹,⁴-androstadiene-11β,17α-diol-3-one 16α-methyl-17β-(2,3-epoxido-propionyl)-Δ¹,⁴,⁶-androstatriene-11β,17α-diol-3-one
9α-fluoro-16α-methyl-17β-(2,3-epoxido-propionyl)-Δ¹,⁴,⁶-androstatriene-11β,17α-diol-3-one
9α-chloro-16α-methyl-17β-(2,3-epoxido-propionyl)-Δ¹,⁴,⁶-androstatriene-11β,17α-diol-3-one
9α-bromo-16α-methyl-17β-(2,3-epoxido-propionyl)-Δ¹,⁴,⁶-androstatriene-11β,17α-diol-3-one
9α-iodo-16α-methyl-17β-(2,3-epoxido-propionyl)-Δ¹,⁴,⁶-androstatriene-11β,17α-diol-3-one
9α-methoxy-16α-methyl-17β-(2,3-epoxido-propionyl)-Δ¹,⁴,⁶-androstatriene-11β,17α-diol-3-one
9α-ethoxy-16α-methyl-17β-(2,3-epoxido-propionyl)-Δ¹,⁴,⁶-androstatriene-11β,17α-diol-3-one 6α,9α-difluoro-17β-(2,3-epoxido-propionyl)-Δ⁴-androstene-11β,17α-diol-3-one
9α-chloro-6α-fluoro-17β-(2,3-epoxido-propionyl)-Δ⁴-androstene-11β,17α-diol-3-one
9α-bromo-6α-fluoro-17β-(2,3-epoxido-propionyl)-Δ⁴-androstene-11β,17α-diol-3-one
9α-iodo-6α-fluoro-17β-(2,3-epoxido-propionyl)-Δ⁴-androstene-11β,17α-diol-3-one
9α-methoxy-6α-fluoro-17β-(2,3-epoxido-propionyl)-Δ⁴-androstene-11β,17α-diol-3-one
9α-ethoxy-6α-fluoro-17β-(2,3-epoxido-propionyl)-Δ⁴-androstene-11β,17α-diol-3-one 6α-fluoro-17β-(2,3-epoxido-propionyl)-Δ¹,⁴-androstadiene-11β,17α-diol-3-one
6α,9α-difluoro-17β-(2,3-epoxido-propionyl)-Δ¹,⁴-androstadiene-11β,17α-diol-3-one
9α-chloro-6α-fluoro-17β-(2,3-epoxido-propionyl)-Δ¹,⁴-androstadiene-11β,17α-diol-3-one
9α-bromo-6α-fluoro-17β-(2,3-epoxido-propionyl)-Δ¹,⁴-androstadiene-11β,17α-diol-3-one
9α-iodo-6α-fluoro-17β-(2,3-epoxido-propionyl)-Δ¹,⁴-androstadiene-11β,17α-diol-3-one
9α-methoxy-6α-fluoro-17β-(2,3-epoxido-propionyl)-Δ¹,⁴-androstadiene-11β,17α-diol-3-one
9α-ethoxy-6α-fluoro-17β-(2,3-epoxido-propionyl)-Δ¹,⁴-androstadiene-11β,17α-diol-3-one 9α-fluoro-16-methylene-17β-(2,3-epoxido-propionyl)-Δ⁴-androstene-11β,17α-diol-3-one
9α-chloro-16-methylene-17β-(2,3-epoxido-propionyl)-Δ⁴-androstene-11β,17α-diol-3-one
9α-bromo-16-methylene-17β-(2,3-epoxido-propionyl)-Δ⁴-androstene-11β,17α-diol-3-one
9α-iodo-16-methylene-17β-(2,3-epoxido-propionyl)-Δ⁴-androstene-11β,17α-diol-3-one
9α-methoxy-16-methylene-17β-(2,3-epoxido-propionyl)-Δ⁴-androstene-11β,17α-diol-3-one
9α-ethoxy-16-methylene-17β-(2,3-epoxido-propionyl)-Δ⁴-androstene-11β,17α-diol-3-one 17β-(2,3-epoxido-propionyl)-Δ⁴,⁶-androstadiene-16α,17α-diol-3,11-dione
9α-fluoro-17β-(2,3-epoxido-propionyl)-Δ⁴,⁶-androstadiene-16α,17α-diol-3,11-dione
9α-chloro-17β-(2,3-epoxido-propionyl)-Δ⁴,⁶-androstadiene-16α,17α-diol-3,11-dione
9α-bromo-17β-(2,3-epoxido-propionyl)-Δ⁴,⁶-androstadiene-16α,17α-diol-3,11-dione
9α-methoxy-17β-(2,3-epoxido-propionyl)-Δ⁴,⁶-androstadiene-16α,17α-diol-3,11-dione
9α-ethoxy-17β-(2,3-epoxido-propionyl)-Δ⁴,⁶-androstadiene-16α,17α-diol-3,11-dione 17β-(2,3-epoxido-propionyl)-Δ¹,⁴,⁶-androstatriene-11β,17α-diol-3-one
9α-fluoro-17β-(2,3-epoxido-propionyl)-Δ¹,⁴,⁶-androstatriene-11β,17α-diol-3-one
9α-chloro-17β-(2,3-epoxido-propionyl)-Δ¹,⁴,⁶-androstatriene-11β,17α-diol-3-one
9α-iodo-17β-(2,3-epoxido-propionyl)-Δ¹,⁴,⁶-androstatriene-11β,17α-diol-3-one
9α-bromo-17β-(2,3-epoxido-propionyl)-Δ¹,⁴,⁶-androstatriene-11β,17α-diol-3-one
9α-methoxy-17β-(2,3-epoxido-propionyl)-Δ¹,⁴,⁶-androstatriene-11β,17α-diol-3-one
9α-ethoxy-17β-(2,3-epoxido-propionyl)-Δ¹,⁴,⁶-androstatriene-11β,17α-diol-3-one 17β-(2,3-epoxido-propionyl)-Δ¹,⁴,⁶-androstatriene-17α-ol-3,11-dione
9α-fluoro-17β-(2,3-epoxido-propionyl)-Δ¹,⁴,⁶-androstatriene-17α-ol-3,11-dione
9α-chloro-17β-(2,3-epoxido-propionyl)-Δ¹,⁴,⁶-androstatriene-17α-ol-3,11-dione
9α-bromo-17β-(2,3-epoxido-propionyl)-Δ¹,⁴,⁶-androstatriene-17α-ol-3,11-dione
9α-iodo-17β-(2,3-epoxido-propionyl)-Δ¹,⁴,⁶-androstatriene-17α-ol-3,11-dione 9α-methoxy-17β-(2,3-epoxido-propionyl)-Δ$^{1,4,6}$-androstatriene-17α-ol-3,11-dione 9α-ethoxy-17β-(2,3-epoxido-propionyl)-Δ$^{1,4,6}$-androstatriene-17α-ol-3,11-dione 2-methyl-17β-(2,3-epoxido-propionyl)-Δ$^{1,4,6}$-androstatriene-11β,17α-diol-3-one 2-methyl-9α-fluoro-17β-(2,3-epoxido-propionyl)-Δ$^{1,4,6}$-androstatriene-11β,17α-diol-3-one 2-methyl-9α-chloro-17β-(2,3-epoxido-propionyl)-Δ$^{1,4,6}$-androstatriene-11β,17α-diol-3-one 2-methyl-9α-bromo-17β-(2,3-epoxido-propionyl)-Δ$^{1,4,6}$-androstatriene-11β,17α-diol-3-one 2-methyl-9α-iodo-17β-(2,3-epoxido-propionyl)-Δ$^{1,4,6}$-androstatriene-11β,17α-diol-3-one 2-methyl-9α-methoxy-17β-(2,3-epoxido-propionyl)-Δ$^{1,4,6}$-androstatriene-11β,17α-diol-3-one 2-methyl-9α-ethoxy-17β-(2,3-epoxido-propionyl)-Δ$^{1,4,6}$-androstatriene-11β,17α-diol-3-one 2-methyl-17β-(2,3-epoxido-propionyl)-Δ$^{1,4,6}$-androstatriene-17α-ol-3,11-dione 2-methyl-9α-fluoro-17β-(2,3-epoxido-propionyl)-Δ$^{1,4,6}$-androstatriene-17α-ol-3,11-dione 2-methyl-9α-chloro-17β-(2,3-epoxido-propionyl)-Δ$^{1,4,6}$-androstatriene-17α-ol-3,11-dione 2-methyl-9α-bromo-17β-(2,3-epoxido-propionyl)-Δ$^{1,4,6}$-androstatriene-17α-ol-3,11-dione 2-methyl-9α-iodo-17β-(2,3-epoxido-propionyl)-Δ$^{1,4,6}$-androstatriene-17α-ol-3,11-dione 2-methyl-9α-methoxy-17β-(2,3-epoxido-propionyl)-Δ$^{1,4,6}$-androstatriene-17α-ol-3,11-dione 2-methyl-9α-ethoxy-17β-(2,3-epoxido-propionyl)-Δ$^{1,4,6}$-androstatriene-17α-ol-3,11-dione 6-methyl-17β-(2,3-epoxido-propionyl)-Δ$^{1,4,6}$-androstatriene-11β,17α-diol-3-one 6-methyl-9α-fluoro-17β-(2,3-epoxido-propionyl)-Δ$^{1,4,6}$-androstatriene-11β,17α-diol-3-one 6-methyl-9α-chloro-17β-(2,3-epoxido-propionyl)-Δ$^{1,4,6}$-androstatriene-11β,17α-diol-3-one 6-methyl-9α-bromo-17β-(2,3-epoxido-propionyl)-Δ$^{1,4,6}$-androstatriene-11β,17α-diol-3-one 6-methyl-9α-iodo-17β-(2,3-epoxido-propionyl)-Δ$^{1,4,6}$-androstatriene-11β,17α-diol-3-one 6-methyl-9α-methoxy-17β-(2,3-epoxido-propionyl)-Δ$^{1,4,6}$-androstatriene-11β,17α-diol-3-one 6-methyl-ethoxy-17β-(2,3-epoxido-propionyl)-Δ$^{1,4,6}$-androstatriene-11β,17α-diol-3-one 6-methyl-17β-(2,3-epoxido-propionyl)-Δ$^{1,4,6}$-androstatriene-17α-ol-3,11-dione 6-methyl-9α-fluoro-17β-(2,3-epoxido-propionyl)-Δ$^{1,4,6}$-androstatriene-17α-ol-3,11-dione 6-methyl-9α-chloro-17β-(2,3-epoxido-propionyl)-Δ$^{1,4,6}$-androstatriene-17α-ol-3,11-dione 6-methyl-9α-bromo-17β-(2,3-epoxido-propionyl)-Δ$^{1,4,6}$-androstatriene-17α-ol-3,11-dione 6-methyl-9α-iodo-17β-(2,3-epoxido-propionyl)-Δ$^{1,4,6}$-androstatriene-17α-ol-3,11-dione 6-methyl-9α-methoxy-17β-(2,3-epoxido-propionyl)-Δ$^{1,4,6}$-androstatriene-17α-ol-3,11-dione 6-methyl-9α-ethoxy-17β-(2,3-epoxido-propionyl)-Δ$^{1,4,6}$-androstatriene-17α-ol-3,11-dione 17β-(2,3-epoxido-propionyl)-Δ$^{1,4,6}$-androstatriene-11β,14α,17α-triol-3-one 9α-fluoro-17β-(2,3-epoxido-propionyl)-Δ$^{1,4,6}$-androstatriene-11β,14α,17α-triol-3-one 9α-chloro-17β-(2,3-epoxido-propionyl)-Δ$^{1,4,6}$-androstatriene-11β,14α,17α-triol-3-one 9α-bromo-17β-(2,3-epoxido-propionyl)-Δ$^{1,4,6}$-androstatriene-11β,14α,17α-triol-3-one 9α-iodo-17β-(2,3-epoxido-propionyl)-Δ$^{1,4,6}$-androstatriene-11β,14α,17α-triol-3-one 9α-methoxy-17β-(2,3-epoxido-propionyl)-Δ$^{1,4,6}$-androstatriene-11β,14α,17α-triol-3-one 9α-ethoxy-17β-(2,3-epoxido-propionyl)-Δ$^{1,4,6}$-androstatriene-11β,14α,17α-triol-3-one 17β-(2,3-epoxido-propionyl)-Δ$^{1,4,6}$-androstatriene-14α,17α-diol-3,11-dione 9α-fluoro-17β-(2,3-epoxido-propionyl)-Δ$^{1,4,6}$-androstatriene-14α,17α-diol-3,11-dione 9α-chloro-17β-(2,3-epoxido-propionyl)-Δ$^{1,4,6}$-androstatriene-14α,17α-diol-3,11-dione 9α-bromo-17β-(2,3-epoxido-propionyl)-Δ$^{1,4,6}$-androstatriene-14α,17α-diol-3,11-dione 9α-iodo-17β-(2,3-epoxido-propionyl)-Δ$^{1,4,6}$-androstatriene-14α,17α-diol-3,11-dione 9α-methoxy-17β-(2,3-epoxido-propionyl)-Δ$^{1,4,6}$-androstatriene-14α-17α-diol-3,11-dione 9α-ethoxy-17β(2,3-epoxido-propionyl)-Δ$^{1,4,6}$-androstatriene-14α,17α-diol-3,11-dione 17β-(2,3-epoxido-propionyl)-Δ$^{1,4,6}$-androstatriene-11β,16α,17α-triol-3-one 9α-fluoro-17β-(2,3-epoxido-propionyl)-Δ$^{1,4,6}$-androstatriene-11β,16α,17α-triol-3-one 9α-chloro-17β-(2,3-epoxido-propionyl)-Δ$^{1,4,6}$-androstatriene-11β,16α,17α-triol-3-one 9α-bromo-17β-(2,3-epoxido-propionyl)-Δ$^{1,4,6}$-androstatriene-11β,16α,17α-triol-3-one 9α-methoxy-17β-(2,3-epoxido-propionyl)-Δ$^{1,4,6}$-androstatriene-11β,16α,17α-triol-3-one 9α-ethoxy-17β(2,3-epoxido-propionyl)-Δ$^{1,4,6}$-androstatriene-11β,16α,17α-triol-3-one 17β-(2,3-epoxido-propionyl)-Δ$^{1,4,6}$-androstatriene-16α,17α-diol-3,11-dione 9α-fluoro-17β-(2,3-epoxido-propionyl)-Δ$^{1,4,6}$-androstatriene-16α,17α-diol-3,11-dione 9α-chloro-17β-(2,3-epoxido-propionyl)-Δ$^{1,4,6}$-androstatriene-16α,17α-diol-3,11-dione 9α-bromo-17β-(2,3-epoxido-propionyl)-Δ$^{1,4,6}$-androstatriene-16α,17α-diol-3,11-dione 9α-iodo-17β-(2,3-epoxido-propionyl)-Δ$^{1,4,6}$-androstatriene16α,17α-diol-3,11-dione 9α-methoxy-17β(2,3-epoxido-propionyl)-Δ$^{1,4,6}$-androstatriene-16α,17α-diol-3,11-dione 9α-ethoxy-17β-(2,3-epoxido-propionyl)-Δ$^{1,4,6}$-androstatriene-16α,17α-diol-3,11-dione 9α-chloro-17β-(3-methyl-2,3-epoxido-propionyl)-Δ$^4$-androstene-11β,17α-diol-3-one 9α-iodo-17β-(3-methyl-2,3-epoxido-propionyl)-Δ$^4$-androstene-11β,17α-diol-3-one 9α-bromo-17β-(3-methyl-2,3-epoxido-propionyl)-Δ$^4$-androstene-11β,17α-diol-3-one 9α-ethoxy-17β-(3-methyl-2,3-epoxido-propionyl)-Δ$^4$-androstene-11β,17α-diol-3-one 17β-(3-methyl-2,3-epoxido-propionyl)-Δ$^4$-androstene-17α-ol-3,11-dione 9α-fluoro-17β-(3-methyl-2,3-epoxido-propionyl)-Δ$^4$-androstene-17α-ol-3,11-dione 9α-chloro-17β-(3-methyl-2,3-epoxido-propionyl)-Δ$^4$-androstene-17α-ol-3,11-dione 9α-bromo-17β-3-methyl-2,3-epoxido-propionyl)-Δ$^4$-androstene-17α-ol-3,11-dione 9α-iodo-17β-(3-methyl-2,3-epoxido-propionyl)-Δ$^4$-androstene-17α-ol-3,11-dione 9α-methoxy-17β-(3-methyl-2,3-epoxido-propionyl)-Δ$^4$-androstene-17α-ol-3,11-dione 9α-ethoxy-17β-(3-methyl-2,3-epoxido-propionyl)-Δ$^4$-androstene-17α-ol-3,11-dione 2α-methyl-17β-(3-methyl-2,3-epoxido-propionyl)-Δ$^4$-androstene-11β,17α-diol-3-one 2α-methyl-9α-fluoro-17β-(3-methyl-2,3-epoxido-propionyl)-Δ$^4$-androstene-11β,17α-diol-3-one 2α-methyl-9α-chloro-17β-(3-methyl-2,3-epoxido-propionyl)-Δ$^4$-androstene-11β,17α-diol-3-one 2α-methyl-9α-bromo-17β-(3-methyl-2,3-epoxido-propionyl)-Δ$^4$-androstene-11β,17α-diol-3-one 2α-methyl-9α-iodo-17β-(3-methyl-2,3-epoxido-propionyl)-Δ⁴-androstene-11β,17α-diol-3-one
2α-methyl-9α-methoxy-17β-(3-methyl-2,3-epoxido-propionyl)-Δ⁴-androstene-11β,17α-diol-3-one
2α-methyl-9α-ethoxy-17β-(3-methyl-2,3-epoxido-propionyl)-Δ⁴-androstene-11β,17α-diol-3-one 2α-methyl-17β-(3-methyl-2,3-epoxido-propionyl)-Δ⁴-androstene-17α-ol-3,11-dione
2α-methyl-9α-fluoro-17β-(3-methyl-2,3-epoxido-propionyl)-Δ⁴-androstene-17α-ol-3,11-dione
2α-methyl-9α-chloro-17β-(3-methyl-2,3-epoxido-propionyl)-Δ⁴-androstene-17α-ol-3,11-dione
2α-methyl-9α-bromo-17β-(3-methyl-2,3-epoxido-propionyl)-Δ⁴-androstene-17α-ol-3,11-dione
2α-methyl-9α-iodo-17β-(3-methyl-2,3-epoxido-propionyl)-Δ⁴-androstene-17α-ol-3,11-dione
2α-methyl-9α-methoxy-17β-(3-methyl-2,3-epoxido-propionyl)-Δ⁴-androstene-17α-ol-3,11-dione
2α-methyl-9α-ethoxy-17β-(3-methyl-2,3-epoxido-propionyl)-Δ⁴-androstene-17α-ol-3,11-dione 6α-methyl-17β-(3-methyl-2,3-epoxido-propionyl)-Δ⁴-androstene-11β,17α-diol-3-one
6α-methyl-9α-fluoro-17β-(3-methyl-2,3-epoxido-propionyl)-Δ⁴-androstene-11β,17α-diol-3-one
6α-methyl-9α-chloro-17β-(3-methyl-2,3-epoxido-propionyl)-Δ⁴-androstene-11β,17α-diol-3-one
6α-methyl-9α-iodo-17β-(3-methyl-2,3-epoxido-propionyl)-Δ⁴-androstene-11β,17α-diol-3-one
6α-methyl-9α-bromo-17β-(3-methyl-2,3-epoxido-propionyl)-Δ⁴-androstene-11β,17α-diol-3-one
6α-methyl-9α-methoxy-17β-(3-methyl-2,3-epoxido-propionyl)-Δ⁴-androstene-11β,17α-diol-3-one
6α-methyl-9α-ethoxy-17β-(3-methyl-2,3-epoxido-propionyl)-Δ⁴-androstene-11β,17α-diol-3-one
6α-methyl-17β-(3-methyl-2,3-epoxido-propionyl)-Δ⁴-androstene-17α-ol-3,11-dione
6α-methyl-9α-fluoro-17β-(3-methyl-2,3-epoxido-propionyl)-Δ⁴-androstene-17α-ol-3,11-dione
6α-methyl-9α-chloro-17β-(3-methyl-2,3-epoxido-propionyl)-Δ⁴-androstene-17α-ol-3,11-dione
6α-methyl-9α-bromo-17β-(3-methyl-2,3-epoxido-propionyl)-Δ⁴-androstene-17α-ol-3,11-dione
6α-methyl-9α-iodo-17β-(3-methyl-2,3-epoxido-propionyl)-Δ⁴-androstene-17α-ol-3,11-dione
6α-methyl-9α-methoxy-17β-(3-methyl-2,3-epoxido-propionyl)-Δ⁴-androstene-17α-ol-3,11-dione
6α-methyl-9α-ethoxy-17β-(3-methyl-2,3-epoxido-propionyl)-Δ⁴-androstene-17α-ol-3,11-dione 17β-(3-methyl-2,3-epoxido-propionyl)-Δ⁴-androstene-11β,14α,17α-triol-3-one
9α-fluoro-17β-(3-methyl-2,3-epoxido-propionyl)-Δ⁴-androstene-11β,14α,17α-triol-3-one
9α-chloro-17β-(3-methyl-2,3-epoxido-propionyl)-Δ⁴-androstene-11β,14α,17α-triol-3-one
9α-bromo-17β-(3-methyl-2,3-epoxido-propionyl)-Δ⁴-androstene-11β,14α,17α-triol-3-one
9α-iodo-17β-(3-methyl-2,3-epoxido-propionyl)-Δ⁴-androstene-11β,14α,17α-triol-3-one
9α-methoxy-17β-(3-methyl-2,3-epoxido-propionyl)-Δ⁴-androstene-11β,14α,17α-triol-3-one
9α-ethoxy-17β-(3-methyl-2,3-epoxido-propionyl)-Δ⁴-androstene-11β,14α,17α-triol-3-one 17β-(3-methyl-2,3-epoxido-propionyl)-Δ⁴-androstene-14α,17α-diol-3,11-dione
9α-fluoro-17β-(3-methyl-2,3-epoxido-propionyl)-Δ⁴-androstene-14α,17α-diol-3,11-dione
9α-chloro-17β-(3-methyl-2,3-epoxido-propionyl)-Δ⁴-androstene-14α,17α-diol-3,11-dione
9α-bromo-17β-(3-methyl-2,3-epoxido-propionyl)-Δ⁴-androstene-14α,17α-diol-3,11-dione
9α-iodo-17β-(3-methyl-2,3-epoxido-propionyl)-Δ⁴-androstene-14α,17α-diol-3,11-dione
9α-methoxy-17β-(3-methyl-2,3-epoxido-propionyl)-Δ⁴-androstene-14α,17α-diol-3,11-dione
9α-ethoxy-17β-(3-methyl-2,3-epoxido-propionyl)-Δ⁴-androstene-14α,17α-diol-3,11-dione 17β-(3-methyl-2,3-epoxido-propionyl)-Δ⁴-androstene-11β,16α,17α-triol-3-one
9α-fluoro-17β-(3-methyl-2,3-epoxido-propionyl)-Δ⁴-androstene-11β,16α,17α-triol-3-one
9α-chloro-17β-(3-methyl-2,3-epoxido-propionyl)-Δ⁴-androstene-11β,16α,17α-triol-3-one
9α-bromo-17β-(3-methyl-2,3-epoxido-propionyl)-Δ⁴-androstene-11β,16α,17α-triol-3-one
9α-iodo-17β-(3-methyl-2,3-epoxido-propionyl)-Δ⁴-androstene-11β,16α,17α-triol-3-one
9α-methoxy-17β-(3-methyl-2,3-epoxido-propionyl)-Δ⁴-androstene-11β,16α,17α-triol-3-one
9α-ethoxy-17β-(3-methyl-2,3-epoxido-propionyl)-Δ⁴-androstene-11β,16α,17α-triol-3-one 17β-(3-methyl-2,3-epoxido-propionyl)-Δ⁴-androstene-16α,17α-diol-3,11-dione
9α-fluoro-17β-(3-methyl-2,3-epoxido-propionyl)-Δ⁴-androstene-16α,17α-diol-3,11-dione
9α-chloro-17β-(3-methyl-2,3-epoxido-propionyl)-Δ⁴-androstene-16α,17α-diol-3,11-dione
9α-bromo-17β-(3-methyl-2,3-epoxido-propionyl)-Δ⁴-androstene-16α,17α-diol-3,11-dione
9α-iodo-17β-(3-methyl-2,3-epoxido-propionyl)-Δ⁴-androstene-16α,17α-diol-3,11-dione
9α-methoxy-17β-(3-methyl-2,3-epoxido-propionyl)-Δ⁴-androstene-16α,17α-diol-3,11-dione
9α-ethoxy-17β-(3-methyl-2,3-epoxido-propionyl)-Δ⁴-androstene-16α,17α-diol-3,11-dione 17β-(3-methyl-2,3-epoxido-propionyl)-Δ⁴-androstene-16α,17α-diol-3,11-dione
9α-chloro-17β-(3-methyl-2,3-epoxido-propionyl)-Δ¹,⁴-androstadiene-11β,17α-diol-3-one
9α-iodo-17β-(3-methyl-2,3-epoxido-propionyl)-Δ¹,⁴-androstadiene-11β,17α-diol-3-one
9α-bromo-17β(3-methyl-2,3-epoxido-propionyl)-Δ¹,⁴-androstadiene-11β,17α-diol-3-one
9α-methoxy-17β-(3-methyl-2,3-epoxido-propionyl)-Δ¹,⁴-androstadiene-11β,17α-diol-3-one
9α-ethoxy-17β-(3-methyl-2,3-epoxido-propionyl)-Δ¹,⁴-androstadiene-11β,17α-diol-3-one 17β-(3-methyl-2,3-epoxido-propionyl)-Δ¹,⁴-androstadiene-17α-ol-3,11-dione
9α-fluoro-17β-(3-methyl-2,3-epoxido-propionyl)-Δ¹,⁴-androstadiene-17α-ol-3,11-dione
9α-chloro-17β-(3-methyl-2,3-epoxido-propionyl)-Δ¹,⁴-androstadiene-17α-ol-3,11-dione
9α-bromo-17β-(3-methyl-2,3-epoxido-propionyl)-Δ¹,⁴-androstadiene-17α-ol-3,11-dione
9α-iodo-17β-(3-methyl-2,3-epoxido-propionyl)-Δ¹,⁴-androstadiene-17α-ol-3,11-dione
9α-methoxy-17β-(3-methyl-2,3-epoxido-propionyl)-Δ¹,⁴-androstadiene-17α-ol-3,11-dione
9α-ethoxy-17β-(3-methyl-2,3-epoxido-propionyl)-Δ¹,⁴-androstadiene-17α-ol-3,11-dione 2-methyl-17β-(3-methyl-2,3-epoxido-propionyl)-Δ¹,⁴-androstadiene-11β,17α-diol-3-one
2-methyl-9α-fluoro-17β-(3-methyl-2,3-epoxido-propionyl)-Δ¹,⁴-androstadiene-11β,17α-diol-3-one
2-methyl-9α-chloro-17β-(3-methyl-2,3-epoxido-propionyl)-Δ¹,⁴-androstadiene-11β,17α-diol-3-one
2-methyl-9α-bromo-17β-(3-methyl-2,3-epoxido-propionyl)-Δ¹,⁴-androstadiene-11β,17α-diol-3-one
2-methyl-9α-iodo-17β-(3-methyl-2,3-epoxido-propionyl)-Δ¹,⁴-androstadiene-11β,17α-diol-3-one
2-methyl-9α-methoxy-17β-(3-methyl-2,3-epoxido-propionyl)-Δ¹,⁴-androstadiene-11β,17α-diol-3-one
2-methyl-9α-ethoxy-17β-(3-methyl-2,3-epoxido-propionyl)-Δ¹,⁴-androstadiene-11β,17α-diol-3-one 2-methyl-17β-(3-methyl-2,3-epoxido-propionyl)-Δ$^{1,4}$-androstadiene-17α-ol-3,11-dione 2-methyl-9α-fluoro-17β-(3-methyl-2,3-epoxido-propionyl)-Δ$^{1,4}$-androstadiene-17α-ol-3,11-dione 2-methyl-9α-chloro-17β-(3-methyl-2,3-epoxido-propionyl)-Δ$^{1,4}$-androstadiene-17α-ol-3,11-dione 2-methyl-9α-bromo-17β-(3-methyl-2,3-epoxido-propionyl)-Δ$^{1,4}$-androstadiene-17α-ol-3,11-dione 2-methyl-9α-iodo-17β-(3-methyl-2,3-epoxido-propionyl)-Δ$^{1,4}$-androstadiene-17α-ol-3,11-dione 2-methyl-9α-methoxy-17β-(3-methyl-2,3-epoxido-propionyl)-Δ$^{1,4}$-androstadiene-17α-ol-3,11-dione 2-methyl-9α-ethoxy-17β-(3-methyl-2,3-epoxido-propionyl)-Δ$^{1,4}$-androstadiene-17α-ol-3,11-dione 6α-methyl-17β-(3-methyl-2,3-epoxido-propionyl)-Δ$^{1,4}$-androstadiene-11β,17α-diol-3-one 6α-methyl-9α-fluoro-17β-(3-methyl-2,3-epoxido-propionyl)-Δ$^{1,4}$-androstadiene-11β,17α-diol-3-one 6α-methyl-9α-chloro-17β-(3-methyl-2,3-epoxido-propionyl)-Δ$^{1,4}$-androstadiene-11β,17α-diol-3-one 6α-methyl-9α-iodo-17β-(3-methyl-2,3-epoxido-propionyl)-Δ$^{1,4}$-androstadiene-11β,17α-diol-3-one 6α-methyl-9α-bromo-17β-(3-methyl-2,3-epoxido-propionyl)-Δ$^{1,4}$-androstadiene-11β,17α-diol-3-one 6α-methyl-9α-methoxy-17β-(3-methyl-2,3-epoxido-propionyl)-Δ$^{1,4}$-androstadiene-11β,17α-diol-3-one 6α-methyl-9α-ethoxy-17β-(3-methyl-2,3-epoxido-propionyl)-Δ$^{1,4}$-androstadiene-11β,17α-diol-3-one 6α-methyl-17β-(3-methyl-2,3-epoxido-propionyl)-Δ$^{1,4}$-androstadiene-17α-ol-3,11-dione 6α-methyl-9α-fluoro-17β-(3-methyl-2,3-epoxido-propionyl)-Δ$^{1,4}$-androstadiene-17α-ol-3,11-dione 6α-methyl-9α-chloro-17β-(3-methyl-2,3-epoxido-propionyl)-Δ$^{1,4}$-androstadiene-17α-ol-3,11-dione 6α-methyl-9α-bromo-17β-(3-methyl-2,3-epoxido-propionyl)-Δ$^{1,4}$-androstadiene-17α-ol-3,11-dione 6α-methyl-9α-iodo-17β-(3-methyl-2,3-epoxido-propionyl)-Δ$^{1,4}$-androstadiene-17α-ol-3,11-dione 6α-methyl-9α-methoxy-17β-(3-methyl-2,3-epoxido-propionyl)-Δ$^{1,4}$-androstadiene-17α-ol-3,11-dione 6α-methyl-9α-ethoxy-17β-(3-methyl-2,3-epoxido-propionyl)-Δ$^{1,4}$-androstadiene-17α-ol-3,11-dione 17β-(3-methyl-2,3-epoxido-propionyl)-Δ$^{1,4}$-androstadiene-11β,14α,17α-triol-3-one 9α-fluoro-17β-(3-methyl-2,3-epoxido-propionyl)-Δ$^{1,4}$-androstadiene-11β,14α,17α-triol-3-one 9α-chloro-17β-(3-methyl-2,3-epoxido-propionyl)-Δ$^{1,4}$-androstadiene-11β,14α,17α-triol-3-one 9α-bromo-17β-(3-methyl-2,3-epoxido-propionyl)-Δ$^{1,4}$-androstadiene-11β,14α,17α-triol-3-one 9α-iodo-17β-(3-methyl-2,3-epoxido-propionyl)-Δ$^{1,4}$-androstadiene-11β,14α,17α-triol-3-one 9α-methoxy-17β-(3-methyl-2,3-epoxido-propionyl)-Δ$^{1,4}$-androstadiene-11β,14α,17α-triol-3-one 9α-ethoxy-17β-(3-methyl-2,3-epoxido-propionyl)-Δ$^{1,4}$-androstadiene-11β,14α,17α-triol-3-one 17β-(3-methyl-2,3-epoxido-propionyl)-Δ$^{1,4}$-androstadiene-14α,17α-diol-3,11-dione 9α-fluoro-17β-(3-methyl-2,3-epoxido-propionyl)-Δ$^{1,4}$-androstadiene-14α,17α-diol-3,11-dione 9α-chloro-17β-(3-methyl-2,3-epoxido-propionyl)-Δ$^{1,4}$-androstadiene-14α,17α-diol-3,11-dione 9α-bromo-17β-(3-methyl-2,3-epoxido-propionyl)-Δ$^{1,4}$-androstadiene-14α,17α-diol-3,11-dione 9α-iodo-17β-(3-methyl-2,3-epoxido-propionyl)-Δ$^{1,4}$-androstadiene-14α,17α-diol-3,11-dione 9α-methoxy-17β-(3-methyl-2,3-epoxido-propionyl)-Δ$^{1,4}$-androstadiene-14α,17α-diol-3,11-dione 9α-ethoxy-17β-(3-methyl-2,3-epoxido-propionyl)-Δ$^{1,4}$-androstadiene-14α,17α-diol-3,11-dione 17β-(3-methyl-2,3-epoxido-propionyl)-Δ$^{1,4}$-androstadiene-11β,16α,17α-triol-3-one 9α-fluoro-17β-(3-methyl-2,3-epoxido-propionyl)-Δ$^{1,4}$-androstadiene-11β,16α,17α-triol-3-one 9α-chloro-17β-(3-methyl-2,3-epoxido-propionyl)-Δ$^{1,4}$-androstadiene-11β,16α,17α-triol-3-one 9α-bromo-17β-(3-methyl-2,3-epoxido-propionyl)-Δ$^{1,4}$-androstadiene-11β,16α,17α-triol-3-one 9α-iodo-17β-(3-methyl-2,3-epoxido-propionyl)-Δ$^{1,4}$-androstadiene-11β,16α,17α-triol-3-one 9α-methoxy-17β-(3-methyl-2,3-epoxido-propionyl)-Δ$^{1,4}$-androstadiene-11β,16α,17α-triol-3-one 9α-ethoxy-17β-(3-methyl-2,3-epoxido-propionyl)-Δ$^{1,4}$-androstadiene-11β,16α,17α-triol-3-one 17β-(3-methyl-2,3-epoxido-propionyl)-Δ$^{1,4}$-androstadiene-16α,17α-diol-3,11-dione 9α-fluoro-17β-(3-methyl-2,3-epoxido-propionyl)-Δ$^{1,4}$-androstadiene-16α,17α-diol-3,11-dione 9α-chloro-17β-(3-methyl-2,3-epoxido-propionyl)-Δ$^{1,4}$-androstadiene-16α,17α-diol-3,11-dione 9α-bromo-17β-(3-methyl-2,3-epoxido-propionyl)-Δ$^{1,4}$-androstadiene-16α,17α-diol-3,11-dione 9α-iodo-17β-(3-methyl-2,3-epoxido-propionyl)-Δ$^{1,4}$-androstadiene-16α,17α-diol-3,11-dione 9α-methoxy-17β-(3-methyl-2,3-epoxido-propionyl)-Δ$^{1,4}$-androstadiene-16α,17α-diol-3,11-dione 9α-ethoxy-17β-(3-methyl-2,3-epoxido-propionyl)-Δ$^{1,4}$-androstadiene-16α,17α-diol-3,11-dione 17β-(3-methyl-2,3-epoxido-propionyl)-Δ$^{4,6}$-androstadiene-11β,17α-diol-3-one 9α-fluoro-17β-(3-methyl-2,3-epoxido-propionyl)-Δ$^{4,6}$-androstadiene-11β,17α-diol-3-one 9α-chloro-17β-(3-methyl-2,3-epoxido-propionyl)-Δ$^{4,6}$-androstadiene-11β,17α-diol-3-one 9α-iodo-17β-(3-methyl-2,3-epoxido-propionyl)-Δ$^{4,6}$-androstadiene-11β,17α-diol-3-one 9α-bromo-17β-(3-methyl-2,3-epoxido-propionyl)-Δ$^{4,6}$-androstadiene-11β,17α-diol-3-one 9α-methoxy-17β-(3-methyl-2,3-epoxido-propionyl)-Δ$^{4,6}$-androstadiene-11β,17α-diol-3-one 9α-ethoxy-17β-(3-methyl-2,3-epoxido-propionyl)-Δ$^{4,6}$-androstadiene-11β,17α-diol-3-one 17β-(3-methyl-2,3-epoxido-propionyl)-Δ$^{4,6}$-androstadiene-17α-ol-3,11-dione 9α-fluoro-17β-(3-methyl-2,3-epoxido-propionyl)-Δ$^{4,6}$-androstadiene-17α-ol-3,11-dione 9α-chloro-17β-(3-methyl-2,3-epoxido-propionyl)-Δ$^{4,6}$-androstadiene-17α-ol-3,11-dione 9α-bromo-17β-(3-methyl-2,3-epoxido-propionyl)-Δ$^{4,6}$-androstadiene-17α-ol-3,11-dione 9α-iodo-17β-(3-methyl-2,3-epoxido-propionyl)-Δ$^{4,6}$-androstadiene-17α-ol-3,11-dione 9α-methoxy-17β-(3-methyl-2,3-epoxido-propionyl)-Δ$^{4,6}$-androstadiene-17α-ol-3,11-dione 9α-ethoxy-17β-(3-methyl-2,3-epoxido-propionyl)-Δ$^{4,6}$-androstadiene-17α-ol-3,11-dione 2α-methyl-17β-(3-methyl-2,3-epoxido-propionyl)-Δ$^{4,6}$-androstadiene-11β,17α-diol-3-one 2α-methyl-9α-fluoro-17β-(3-methyl-2,3-epoxido-propionyl)-Δ$^{4,6}$-androstadiene-11β,17α-diol-3-one 2α-methyl-9α-chloro-17β-(3-methyl-2,3-epoxido-propionyl)-Δ$^{4,6}$-androstadiene-11β,17α-diol-3-one 2α-methyl-9α-bromo-17β-(3-methyl-2,3-epoxido-propionyl)-Δ$^{4,6}$-androstadiene-11β,17α-diol-3-one 2α-methyl-9α-iodo-17β-(3-methyl-2,3-epoxido-propionyl)-Δ$^{4,6}$-androstadiene-11β,17α-diol-3-one 2α-methyl-9α-methoxy-17β-(3-methyl-2,3-epoxido-propionyl)-Δ$^{4,6}$-androstadiene-11β,17α-diol-3-one 2α-ethoxy-9α-ethoxy-17β-(3-methyl-2,3-epoxido-propionyl)-Δ$^{4,6}$-androstadiene-11β,17α-diol-3-one 2α-methyl-17β-(3-methyl-2,3-epoxido-propionyl)-Δ$^{4,6}$-androstadiene-17α-ol-3,11-dione 2α-methyl-9α-fluoro-17β-(3-methyl-2,3-epoxido-propionyl)-Δ$^{4,6}$-androstadiene-17α-ol-3,11-dione 2α-methyl-9α-chloro-17β-(3-methyl-2,3-epoxido-propionyl)-Δ⁴,⁶-androstadiene-17α-ol-3,11-dione
2α-methyl-9α-bromo-17β-(3-methyl-2,3-epoxido-propionyl)-Δ⁴,⁶-androstadiene-17α-ol-3,11-dione
2α-methyl-9α-iodo-17β-(3-methyl-2,3-epoxido-propionyl)-Δ⁴,⁶-androstadiene-17α-ol-3,11-dione
2α-methyl-9α-methoxy-17β-(3-methyl-2,3-epoxido-propionyl)-Δ⁴,⁶-androstadiene-17α-ol-3,11-dione
2α-methyl-9α-ethoxy-17β-(3-methyl-2,3-epoxido-propionyl)-Δ⁴,⁶-androstadiene-17α-ol-3,11-dione 6-methyl-17β-(3-methyl-2,3-epoxido-propionyl)-Δ⁴,⁶-androstadiene-11β,17α-diol-3-one
6-methyl-9α-fluoro-17β-(3-methyl-2,3-epoxido-propionyl)-Δ⁴,⁶-androstadiene-11β,17α-diol-3-one
6-methyl-9α-chloro-17β-(3-methyl-2,3-epoxido-propionyl)-Δ⁴,⁶-androstadiene-11β,17α-diol-3-one
6-methyl-9α-iodo-17β-(3-methyl-2,3-epoxido-propionyl)-Δ⁴,⁶-androstadiene-11β,17α-diol-3-one
6-methyl-9α-bromo-17β-(3-methyl-2,3-epoxido-propionyl)-Δ⁴,⁶-androstadiene-11β,17α-diol-3-one
6-methyl-9α-methoxy-17β-(3-methyl-2,3-epoxido-propionyl)-Δ⁴,⁶-androstadiene-11β,17α-diol-3-one
6-methyl-9α-ethoxy-17β-(3-methyl-2,3-epoxido-propionyl)-Δ⁴,⁶-androstadiene-11β,17α-diol-3-one 6-methyl-17β-(3-methyl-2,3-epoxido-propionyl)-Δ⁴,⁶-androstadiene-17α-ol-3-11-dione
6-methyl-9α-fluoro-17β-(3-methyl-2,3-epoxido-propionyl)-Δ⁴,⁶-androstadiene-17α-ol-3,11-dione
6-methyl-9α-chloro-17β-(3-methyl-2,3-epoxido-propionyl)-Δ⁴,⁶-androstadiene-17α-ol-3,11-dione
6-methyl-9α-bromo-17β-(3-methyl-2,3-epoxido-propionyl)-Δ⁴,⁶-androstadiene-17α-ol-3,11-dione
6-methyl-9α-iodo-17β-(3-methyl-2,3-epoxido-propionyl)-Δ⁴,⁶-androstadiene-17α-ol-3,11-dione
6-methyl-9α-methoxy-17β-(3-methyl-2,3-epoxido-propionyl)-Δ⁴,⁶-androstadiene-17α-ol-3,11-dione
6-methyl-9α-ethoxy-17β-(3-methyl-2,3-epoxido-propionyl)-Δ⁴,⁶-androstadiene-17α-ol-3,11-dione 17β-(3-methyl-2,3-epoxido-propionyl)-Δ⁴,⁶-androstadiene-11β,14α,17α-triol-3-one
9α-fluoro-17β-(3-methyl-2,3-epoxido-propionyl)-Δ⁴,⁶-androstadiene-11β,14α,17α-triol-3-one
9α-chloro-17β-(3-methyl-2,3-epoxido-propionyl)-Δ⁴,⁶-androstadiene-11β,14α,17α-triol-3-one
9α-bromo-17β-(3-methyl-2,3-epoxido-propionyl)-Δ⁴,⁶-androstadiene-11β,14α,17α-triol-3-one
9α-iodo-17β-(3-methyl-2,3-epoxido-propionyl)-Δ⁴,⁶-androstadiene-11β,14α,17α-triol-3-one
9α-methoxy-17β-(3-methyl-2,3-epoxido-propionyl)-Δ⁴,⁶-androstadiene-11β,14α,17α-triol-3-one
9α-ethoxy-17β-(3-methyl-2,3-epoxido-propionyl)-Δ⁴,⁶-androstadiene-11β,14α,17α-triol-3-one 17β-(3-methyl-2,3-epoxido-propionyl)-Δ⁴,⁶-androstadiene-14α,17α-diol-3,11-dione
9α-fluoro-17β-(3-methyl-2,3-epoxido-propionyl)-Δ⁴,⁶-androstadiene-14α,17α-diol-3,11-dione
9α-chloro-17β-(3-methyl-2,3-epoxido-propionyl)-Δ⁴,⁶-androstadiene-14α,17α-diol-3,11-dione
9α-bromo-17β-(3-methyl-2,3-epoxido-propionyl)-Δ⁴,⁶-androstadiene-14α,17α-diol-3,11-dione
9α-iodo-17β-(3-methyl-2,3-epoxido-propionyl)-Δ⁴,⁶-androstadiene-14α,17α-diol-3,11-dione
9α-methoxy-17β-(3-methyl-2,3-epoxido-propionyl)-Δ⁴,⁶-androstadiene-14α,17α-diol-3,11-dione
9α-ethoxy-17β-(3-methyl-2,3-epoxido-propionyl)-Δ⁴,⁶-androstadiene-14α,17α-diol-3,11-dione 17β-(3-methyl-2,3-epoxido-propionyl)-Δ⁴,⁶-androstadiene-11β,16α,17α-triol-3-one
9α-fluoro-17β-(3-methyl-2,3-epoxido-propionyl)-Δ⁴,⁶-androstadiene-11β,16α,17α-triol-3-one
9α-chloro-17β-(3-methyl-2,3-epoxido-propionyl)-Δ⁴,⁶-androstadiene-11β,16α,17α-triol-3-one
9α-bromo-17β-(3-methyl-2,3-epoxido-propionyl)-Δ⁴,⁶-androstadiene-11β,16α,17α-triol-3-one
9α-iodo-17β-(3-methyl-2,3-epoxido-propionyl)-Δ⁴,⁶-androstadiene-11β,16α,17α-triol-3-one
9α-methoxy-17β-(3-methyl-2,3-epoxido-propionyl)-Δ⁴,⁶-androstadiene-11β,16α,17α-triol-3-one
9α-ethoxy-17β-(3-methyl-2,3-epoxido-propionyl)-Δ⁴,⁶-androstadiene-11β,16α,17α-triol-3-one 17β-(3-methyl-2,3-epoxido-propionyl)-Δ⁴,⁶-androstadiene-16α,17α-diol-3,11-dione
9α-fluoro-17β-(3-methyl-2,3-epoxido-propionyl)-Δ⁴,⁶-androstadiene-16α,17α-diol-3,11-dione
9α-chloro-17β-(3-methyl-2,3-epoxido-propionyl)-Δ⁴,⁶-androstadiene-16α,17α-diol-3,11-dione
9α-bromo-17β-(3-methyl-2,3-epoxido-propionyl)-Δ⁴,⁶-androstadiene-16α,17α-diol-3,11-dione
9α-methoxy-17β-(3-methyl-2,3-epoxido-propionyl)-Δ⁴,⁶-androstadiene-16α,17α-diol-3,11-dione
9α-ethoxy-17β-(3-methyl-2,3-epoxido-propionyl)-Δ⁴,⁶-androstadiene-16α,17α-diol-3,11-dione 17β-(3-methyl-2,3-epoxido-propionyl)Δ¹,⁴,⁶-androstatriene-11β,17α-diol-3-one
9α-fluoro-17β-(3-methyl-2,3-epoxido-propionyl)-Δ¹,⁴,⁶-androstatriene-11β,17α-diol-3-one
9α-chloro-17β-(3-methyl-2,3-epoxido-propionyl)-Δ¹,⁴,⁶-androstatriene-11β,17α-diol-3-one
9α-iodo-17β-(3-methyl-2,3-epoxido-propionyl)-Δ¹,⁴,⁶-androstatriene-11β,17α-diol-3-one
9α-bromo-17β-(3-methyl-2,3-epoxido-propionyl)-Δ¹,⁴,⁶-androstatriene-11β,17α-diol-3-one
9α-methoxy-17β-(3-methyl-2,3-epoxido-propionyl)-Δ¹,⁴,⁶-androstatriene-11β,17α-diol-3-one
9α-ethoxy-17β-(3-methyl-2,3-epoxido-propionyl)-Δ¹,⁴,⁶-androstatriene-11β,17α-diol-3-one 17β-(3-methyl-2,3-epoxido-propionyl)Δ¹,⁴,⁶-androstatriene-17α-ol-3,11-dione
9α-fluoro-17β-(3-methyl-2,3-epoxido-propionyl)-Δ¹,⁴,⁶-androstatriene-17α-ol-3,11-dione
9α-chloro-17β-(3-methyl-2,3-epoxido-propionyl)-Δ¹,⁴,⁶-androstatriene-17α-ol-3,11-dione
9α-bromo-17β-(3-methyl-2,3-epoxido-propionyl)-Δ¹,⁴,⁶-androstatriene-17α-ol-3,11-dione
9α-iodo-17β-(3-methyl-2,3-epoxido-propionyl)-Δ¹,⁴,⁶-androstatriene-17α-ol-3,11-dione
9α-methoxy-17β-(3-methyl-2,3-epoxido-propionyl)-Δ¹,⁴,⁶-androstatriene-17α-ol-3,11-dione
9α-ethoxy-17β-(3-methyl-2,3-epoxido-propionyl)-Δ¹,⁴,⁶-androstatriene-17α-ol-3,11-dione 2α-methyl-17β-(3-methyl-2,3-epoxido-propionyl)-Δ¹,⁴,⁶-androstatriene-11β,17α-diol-3-one
2α-methyl-9α-fluoro-17β-(3-methyl-2,3-epoxido-propionyl)-Δ¹,⁴,⁶-androstatriene-11β,17α-diol-3-one
2α-methyl-9α-chloro-17β-(3-methyl-2,3-epoxido-propionyl)-Δ¹,⁴,⁶-androstatriene-11β,17α-diol-3-one
2α-methyl-9α-bromo-17β-(3-methyl-2,3-epoxido-propionyl)-Δ¹,⁴,⁶-androstatriene-11β,17α-diol-3-one
2α-methyl-9α-iodo-17β-(3-methyl-2,3-epoxido-propionyl)-Δ¹,⁴,⁶-androstatriene-11β,17α-diol-3-one
2α-methyl-9α-methoxy-17β-(3-methyl-2,3-epoxido-propionyl)-Δ¹,⁴,⁶-androstatriene-11β,17α-diol-3-one
2α-methyl-9α-ethoxy-17β-(3-methyl-2,3-epoxido-propionyl)-Δ¹,⁴,⁶-androstatriene-11β,17α-diol-3-one 2α-methyl-17β-(3-methyl-2,3-epoxido-propionyl)-Δ¹,⁴,⁶-androstatriene-17α-ol-3,11-dione
2α-methyl-9α-fluoro-17β-(3-methyl-2,3-epoxido-propionyl)-Δ¹,⁴,⁶-androstatriene-17α-ol-3,11-dione
2α-methyl-9α-chloro-17β-(3-methyl-2,3-epoxido-propionyl)-Δ¹,⁴,⁶-androstatriene-17α-ol-3,11-dione
2α-methyl-9α-bromo-17β-(3-methyl-2,3-epoxido-propionyl)-Δ¹,⁴,⁶-androstatriene-17α-ol-3,11-dione
2α-methyl-9α-iodo-17β-(3-methyl-2,3-epoxido-propionyl)-Δ¹,⁴,⁶-androstatriene-17α-ol-3,11-dione 2α-methyl-9α-methoxy-17β-(3-methyl-2,3-epoxido-propionyl)-Δ$^{1,4,6}$-androstatriene-17α-ol-3,11-dione 2α-methyl-9α-ethoxy-17β-(3-methyl-2,3-epoxido-propionyl)-Δ$^{1,4,6}$-androstatriene-17α-ol-3,11-dione 6-methyl-17β-(3-methyl-2,3-epoxido-propionyl)-Δ$^{1,4,6}$-androstatriene-11β,17α-diol-3-one 6-methyl-9α-fluoro-17β-(3-methyl-2,3-epoxido-propionyl)-Δ$^{1,4,6}$-androstatriene-11β,17α,diol-2-one 6-methyl-9α-chloro-17β-(3-methyl-2,3-epoxido-propionyl)-Δ$^{1,4,6}$-androstatriene-11β,17α-diol-3-one 6-methyl-9α-bromo-17β-(3-methyl-2,3-epoxido-propionyl)-Δ$^{1,4,6}$-androstatriene-11β,17α-diol-3-one 6-methyl-9α-iodo-17β-(3-methyl-2,3-epoxido-propionyl)-Δ$^{1,4,6}$-androstatriene-11β,17α-diol-3-one 6-methyl-9α-methoxy-17β-(3-methyl-2,3-epoxido-propionyl)-Δ$^{1,4,6}$-androstatriene-11β,17α-diol-3-one 6-methyl-9α-ethoxy-17β-(3-methyl-2,3-epoxido-propionyl)-Δ$^{1,4,6}$-androstatriene-11β,17α-diol-3-one 6-methyl-17β-(3-methyl-2,3-epoxido-propionyl)-Δ$^{1,4,6}$-androstatriene-17α-ol-3,11-dione 6-methyl-9α-fluoro-17β-(3-methyl-2,3-epoxido-propionyl)-Δ$^{1,4,6}$-androstatriene-17α-ol-3,11-dione 6-methyl-9α-chloro-17β-(3-methyl-2,3-epoxido-propionyl)-Δ$^{1,4,6}$-androstatriene-17α-ol-3,11-dione 6-methyl-9α-bromo-17β-(3-methyl-2,3-epoxido-propionyl)-Δ$^{1,4,6}$-androstatriene-17α-ol-3,11-dione 6-methyl-9α-iodo-17β-(3-methyl-2,3-epoxido-propionyl)-Δ$^{1,4,6}$-androstatriene-17α-ol-3,11-dione 6-methyl-9α-methoxy-17β-(3-methyl-2,3-epoxido-propionyl)-Δ$^{1,4,6}$-androstatriene-17α-ol-3,11-dione 6-methyl-9α-ethoxy-17β(3-methyl-2,3-epoxido-propionyl)-Δ$^{1,4,6}$-androstatriene-17α-ol-3,11-dione 17β-(3-methyl-2,3-epoxido-propionyl)-Δ$^{1,4,6}$-androstatriene-11β,14α,17α-triol-3-one 9α-fluoro-17β-(3-methyl-2,3-epoxido-propionyl)-Δ$^{1,4,6}$-androstatriene-11β,14α,17α-triol-3-one 9α-chloro-17β-(3-methyl-2,3-epoxido-propionyl)-Δ$^{1,4,6}$-androstatriene-11β,14α,17α-triol-3-one 9α-bromo-17β-(3-methyl-2,3-epoxido-propionyl)-Δ$^{1,4,6}$-androstatriene-11β,14α,17α-triol-3-one 9α-iodo-17β-(3-methyl-2,3-epoxido-propionyl)-Δ$^{1,4,6}$-androstatriene-11β,14α,17α-triol-3-one 9α-methoxy-17β-(3-methyl-2,3-epoxido-propionyl)-Δ$^{1,4,6}$-androstatriene-11β,14α,17α-triol-3-one 9α-ethoxy-17β-(3-methyl-2,3-epoxido-propionyl)-Δ$^{1,4,6}$-androstatriene-11β,14α,17α-triol-3-one 17β-(3-methyl-2,3-epoxido-propionyl)-Δ$^{1,4,6}$-androstatriene-14α,17α-diol-3,11-dione 9α-fluoro-17β-(3-methyl-2,3-epoxido-propionyl)-Δ$^{1,4,6}$-androstatriene-14α,17α-diol-3,11-dione 9α-chloro-17β-(3-methyl-2,3-epoxido-propionyl)-Δ$^{1,4,6}$-androstatriene-14α,17α-diol-3,11-dione 9α-bromo-17β-(3-methyl-2,3-epoxido-propionyl)-Δ$^{1,4,6}$-androstatriene-14α,17α-diol-3,11-dione 9α-iodo-17β-(3-methyl-2,3-epoxido-propionyl)-Δ$^{1,4,6}$-androstatriene-14α,17α-diol-3,11-dione 9α-methoxy-17β-(3-methyl-2,3-epoxido-propionyl)-Δ$^{1,4,6}$-androstatriene-14α,17α-diol-3,11-dione 9α-ethoxy-17β-(3-methyl-2,3-epoxido-propionyl)-Δ$^{1,4,6}$-androstatriene-14α,17α-diol-3,11-dione 17β-(3-methyl-2,3-epoxido-propionyl)-Δ$^{1,4,6}$-androstatriene-11β,16α,17α-triol-3-one 9α-fluoro-17β-(3-methyl-2,3-epoxido-propionyl)-Δ$^{1,4,6}$-androstatriene-11β,16α,17α-triol-3-one 9α-chloro-17β-(3-methyl-2,3-epoxido-propionyl)-Δ$^{1,4,6}$-androstatriene-11β,16α,17α-triol-3-one 9α-bromo-17β-(3-methyl-2,3-epoxido-propionyl)-Δ$^{1,4,6}$-androstatriene-11β,16α,17α-triol-3-one 9α-methoxy-17β-(3-methyl-2,3-epoxido-propionyl)-Δ$^{1,4,6}$-androstatriene-11β,16α,17α-triol-3-one 9α-ethoxy-17β-(3-methyl-2,3-epoxido-propionyl)-Δ$^{1,4,6}$-androstatriene-11β,16α,17α-triol-3-one 17β-(3-methyl-2,3-epoxido-propionyl)-Δ$^{1,4,6}$-androstatriene-16α,17α-diol-3,11-dione 9α-fluoro-17β-(3-methyl-2,3-epoxido-propionyl)-Δ$^{1,4,6}$-androstatriene-16α,17α-diol-3,11-dione 9α-chloro-17β-(3-methyl-2,3-epoxido-propionyl-)Δ$^{1,4,6}$-androstatriene-16α,17α-diol-3,11-dione 9α-bromo-17β-(3-methyl-2,3-epoxido-propionyl)-Δ$^{1,4,6}$-androstatriene-16α,17α-diol-3,11-dione 9α-iodo-17β-(3-methyl-2,3-epoxido-propionyl)-Δ$^{1,4,6}$-androstatriene-16α,17α-diol-3,11-dione 9α-methoxy-17β-(3-methyl-2,3-epoxido-propionyl)-Δ$^{1,4,6}$-androstatriene-16α,17α-diol-3,11-dione 9α-ethoxy-17β-(3-methyl-2,3-epoxido-propionyl)-Δ$^{1,4,6}$-androstatriene-16α,17α-diol-3,11-dione 6α-chloro-17β-(2,3-epoxido-propionyl)-Δ$^{4}$-androstene-11β,17α-diol-3-one 6α-chloro-9α-fluoro-17β-(2,3-epoxido-propionyl)-Δ$^{4}$-androstene-11β,17α-diol-3-one 6α,9α-dichloro-17β-(2,3-epoxido-propionyl)-Δ$^{4}$-androstene-11β,17α-diol-3-one 6α-chloro-9α-bromo-17β-(2,3-epoxido-propionyl)-Δ$^{4}$-androstene-11β,17α-diol-3-one 6α-chloro-9α-iodo-17β-(2,3-epoxido-propionyl)-Δ$^{4}$-androstene-11β,17α-diol-3-one 6α-chloro-9α-methoxy-17β-(2,3-epoxido-propionyl)-Δ$^{4}$-androstene-11β,17α-diol-3-one 6α-chloro-9α-ethoxy-17β-(2,3-epoxido-propionyl)-Δ$^{4}$-androstene-11β,17α-diol-3-one The 16-hydroxy compounds listed above are all converted to esters within the purview of this invention by treatment with excess acid anhydride in the presence of pyridine by standard known methods. The compounds prepared include the acetate, propionate, propenoate, isobutyrate, hexanoate, benzoate, octanoate, decanoate hemigluconate, trimethylacetate, cyclohexylcarbonate, hemisuccinate and hemigluconate. The acid esters prepared from dicarboxylic acids are readily converted to water soluble compounds by treatment with diluted aqueous base, for example, sodium, potassium or barium hydroxide or carbonate.

These compounds are hydrolyzed to the free alcohols by treatment with alcoholic potassium carbonate in accordance with standard procedures.

Compounds within the purview of this invention having an 11-keto group are prepared by oxidation of the 11β-hydroxyl group. The oxidation may be effected before preparing the aldehyde or by oxidizing the final product. Those compounds having a 16α-hydroxyl group are best oxidized after the protection of the 16α-hydroxyl group by esterification. Failure to do so leads to a mixture of products as a result of simultaneous oxidation of the hydroxyl groups. These oxidations are effected by procedures well known in the art, including, for example, the use of chromium trioxide or the chromic acid-pyridine complex.

The following example is illustrative of the procedure used to prepare the 16,17-acetonides of this invention, including those prepared from the compounds of the previous examples. Those prepared by this method include the acetals and ketals from acetaldehyde, propionaldehyde, butyraldehyde, acetone, di-isopropyl ketone, methyl ethyl ketone and di-n-butyl ketone.

9α - fluoro-17β-(2,3-epoxido-propionyl)-Δ$^{1,4}$-androstadiene-11β,16α,17α-diol-3-one (100 mg.) was taken up in 100 ml. of acetone which had been previously dried over anhydrous potassium carbonate. To this mixture there was added 495 mg. of anhydrous copper sulfate and the mixture was stirred at 20° C. to 30° C. for two days. It was then filtered, dried over anhydrous potassium carbonate, again filtered and the excess solvent removed in vacuo. The residue was triturated with ether containing a few drops of acetone and the desired product recovered by filtration.

What is claimed:
1. A compound selected from the group consisting of those having the formulas:

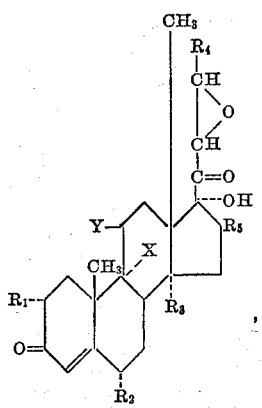

,

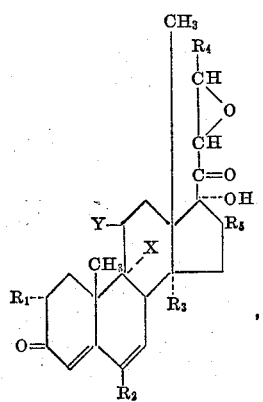

,

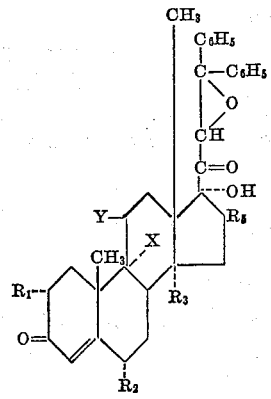

,

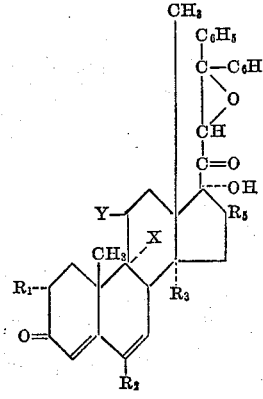

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_4$ is selected from the group consisting of hydrogen, alkyl containing up to four carbon atoms and carbalkoxy, the alkoxy moiety containing up to four carbon atoms; $R_5$ is selected from the group consisting of

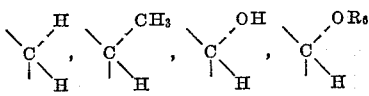

and

wherein $R_6$ is an acyl group containing only carbon, hydrogen and oxygen derived from mono- and dicarboxylic acids containing up to ten carbon atoms; X is selected from the group consisting of hydrogen, halogen, methoxy and ethoxy and Y is selected from the group consisting of keto and β-hydroxyl; at least one hydrogen always being attached to the number sixteen carbon atom; at least three of $R_1$, $R_2$, $R_3$ and the second substituent on the number sixteen carbon atom always being hydrogen; 16,17-acetonides of said 16,17-hydroxylated compounds, the acetonide moiety containing from two to nine carbon atoms, and alkali and alkaline earth metal salts of said 16-acylated hydroxyl compounds wherein the acyl group is derived from a dicarboxylic acid.

2. A pharmaceutical composition comprising a compound as claimed in claim 1 together with a pharmaceutically acceptable carirer.

3. A process for the preparation of a compound selected from the group represented by the formulas:

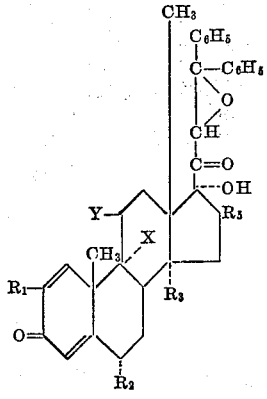

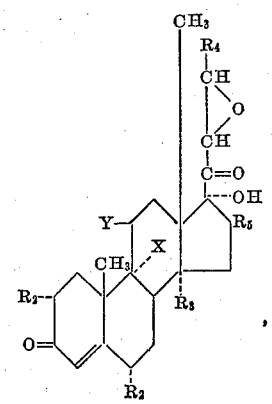

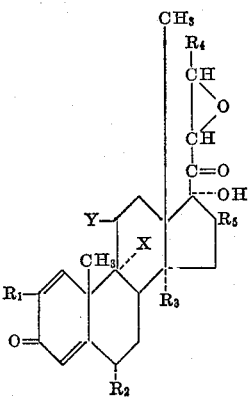

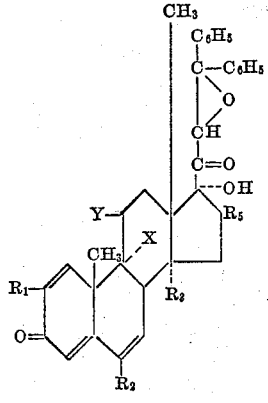

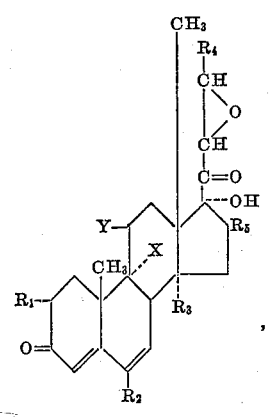

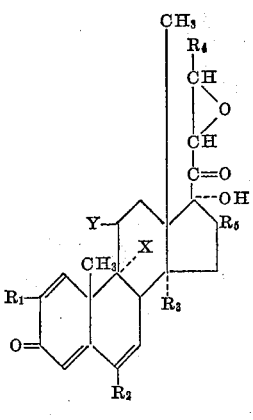

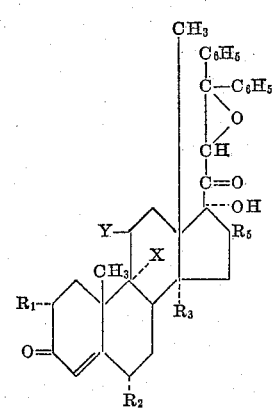

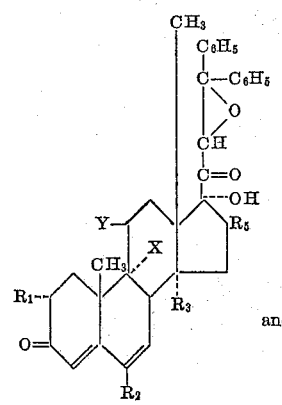

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_4$ is selected from the group consisting of hydrogen, alkyl containing up to four carbon atoms and carbalkoxy, the alkoxy moiety containing up to four carbon atoms; $R_5$ is selected from the group consisting of:

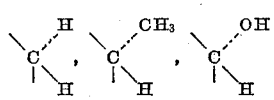

and

X is selected from the group consisting of hydrogen, halogen, methoxy and ethoxy and Y is selected from the group consisting of keto and β-hydroxyl; at least one hydrogen always being attached to the number sixteen carbon atom; at least three of $R_1$, $R_2$, $R_3$ and the second substituent on the number sixteen carbon atom always being hydrogen which comprises reacting a compound selected from the group represented by the formulas:

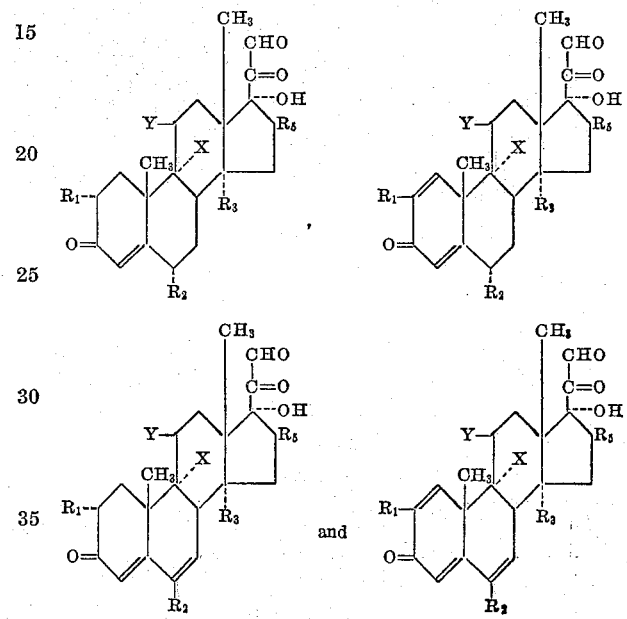

wherein $R_1$, $R_2$, $R_3$, $R_5$, X and Y have the same meaning as above with a diazo compound selected from the group consisting of straight chain alkyl diazo compounds containing up to four carbon atoms, diphenyldiazomethane and lower alkyl diazoacetates wherein the alkyl group contains up to four carbon atoms in a lower polar aliphatic oxygenated solvent containing up to five carbon atoms.

No references cited.